US007512607B2

(12) United States Patent
Nagano et al.

(10) Patent No.: US 7,512,607 B2
(45) Date of Patent: Mar. 31, 2009

(54) CONTENT SHARING SYSTEM; CONTENT PROCESSING APPARATUS; INFORMATION PROCESSING APPARATUS; PROGRAM; RECORDING MEDIUM; AND CONTENT SHARING METHOD

(75) Inventors: Motohiko Nagano, Tokyo (JP); Munetake Ebihara, Kanagawa (JP); Mitsuru Tanabe, Kanagawa (JP); Ichiro Sato, Chiba (JP); Hiroshi Kuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 470 days.

(21) Appl. No.: 10/970,185

(22) Filed: Oct. 22, 2004

(65) Prior Publication Data
US 2005/0114333 A1 May 26, 2005

(30) Foreign Application Priority Data
Nov. 10, 2003 (JP) ............................. 2003-379692

(51) Int. Cl.
*G06F 17/30* (2006.01)
(52) U.S. Cl. ........................... 707/9; 707/10; 707/104.1
(58) Field of Classification Search ............... 707/9–10, 707/100, 101, 102, 104.1; 713/161, 169, 713/170, 176; 340/5.8; 359/2; 379/142.05; 380/229, 232; 455/411
See application file for complete search history.

(56) References Cited

U.S. PATENT DOCUMENTS

| 5,584,022 A * | 12/1996 | Kikuchi et al. ............... 707/9 |
| 5,739,864 A * | 4/1998 | Copeland .................... 348/473 |
| 5,960,398 A * | 9/1999 | Fuchigami et al. ........... 704/270 |
| 6,092,194 A * | 7/2000 | Touboul ........................ 726/24 |
| 6,351,816 B1 * | 2/2002 | Mueller et al. ............... 713/176 |
| 6,476,833 B1 * | 11/2002 | Moshfeghi .................... 715/854 |
| 6,820,083 B1 * | 11/2004 | Nagy et al. ..................... 707/9 |
| 7,310,629 B1 * | 12/2007 | Mendelson et al. ............. 707/3 |
| 2001/0011237 A1 * | 8/2001 | Tanaka et al. ................. 705/27 |
| 2001/0041053 A1 * | 11/2001 | Abecassis ..................... 386/83 |
| 2002/0023053 A1 * | 2/2002 | Szoc et al. .................... 705/39 |
| 2002/0033844 A1 * | 3/2002 | Levy et al. ................... 345/744 |
| 2002/0152387 A1 * | 10/2002 | Asano ......................... 713/176 |
| 2002/0186844 A1 * | 12/2002 | Levy et al. ................... 380/231 |
| 2002/0194108 A1 * | 12/2002 | Kitze ........................... 705/37 |
| 2003/0037010 A1 * | 2/2003 | Schmelzer .................... 705/67 |
| 2003/0095660 A1 * | 5/2003 | Lee et al. ..................... 380/231 |
| 2003/0191720 A1 * | 10/2003 | Wibisono ..................... 705/54 |

* cited by examiner

*Primary Examiner*—Diane Mizrahi
(74) *Attorney, Agent, or Firm*—Oblon, Spivak, McClelland, Maier & Neustadt, P.C.

(57) ABSTRACT

A content sharing system is disclosed that can efficiently execute copyright management for limiting illegal utilization of content, and can promote the degree of freedom in utilization of content within a legal range of private utilization. In the content sharing system, a content processing apparatus on the content providing side includes a source ID addition section for adding, to the content data, a source ID for specifying a providing source of content data. Meanwhile, another content processing apparatus on the content acquiring side includes a content rendering section having a rendering permission ID list including source IDs, added to content data whose rendering is permitted, for limiting, based on the source ID added to the acquired content data and the rendering permission ID list, rendering of acquired content data rendering. The content sharing system further includes a list management section for permitting updating of the rendering permission ID list.

34 Claims, 21 Drawing Sheets

FIG. 5

SOURCE ID: 0123-456789

- 1st DIGIT → GENRE CODE
- 2nd DIGIT
- 3rd~4th DIGITS
- 5th~10th DIGITS → UNIQUE ID

Genre code breakdown: 1st digit, 2nd digit, 3rd~4th digits

⟨CONTENT TYPE⟩

| | |
|---|---|
| 0 | SOUND |
| 1 | IMAGE |
| 2 | ELECTRONIC BOOK |
| 0 | SOFTWARE |
| ...... | ...... |

⟨CONTENT PRODUCTION SOURCE TYPE⟩

| | |
|---|---|
| 0 | CONTENT PROCESSING APPARATUS |
| 1 | DISTRIBUTION SERVICE |
| ...... | ...... |

⟨COMPANY AND SERVICE TYPE⟩

| | |
|---|---|
| 00 | A COMPANY α SERVICE |
| 01 | A COMPANY β SERVICE |
| 02 | B COMPANY γ SERVICE |
| ...... | ...... |

F I G. 7
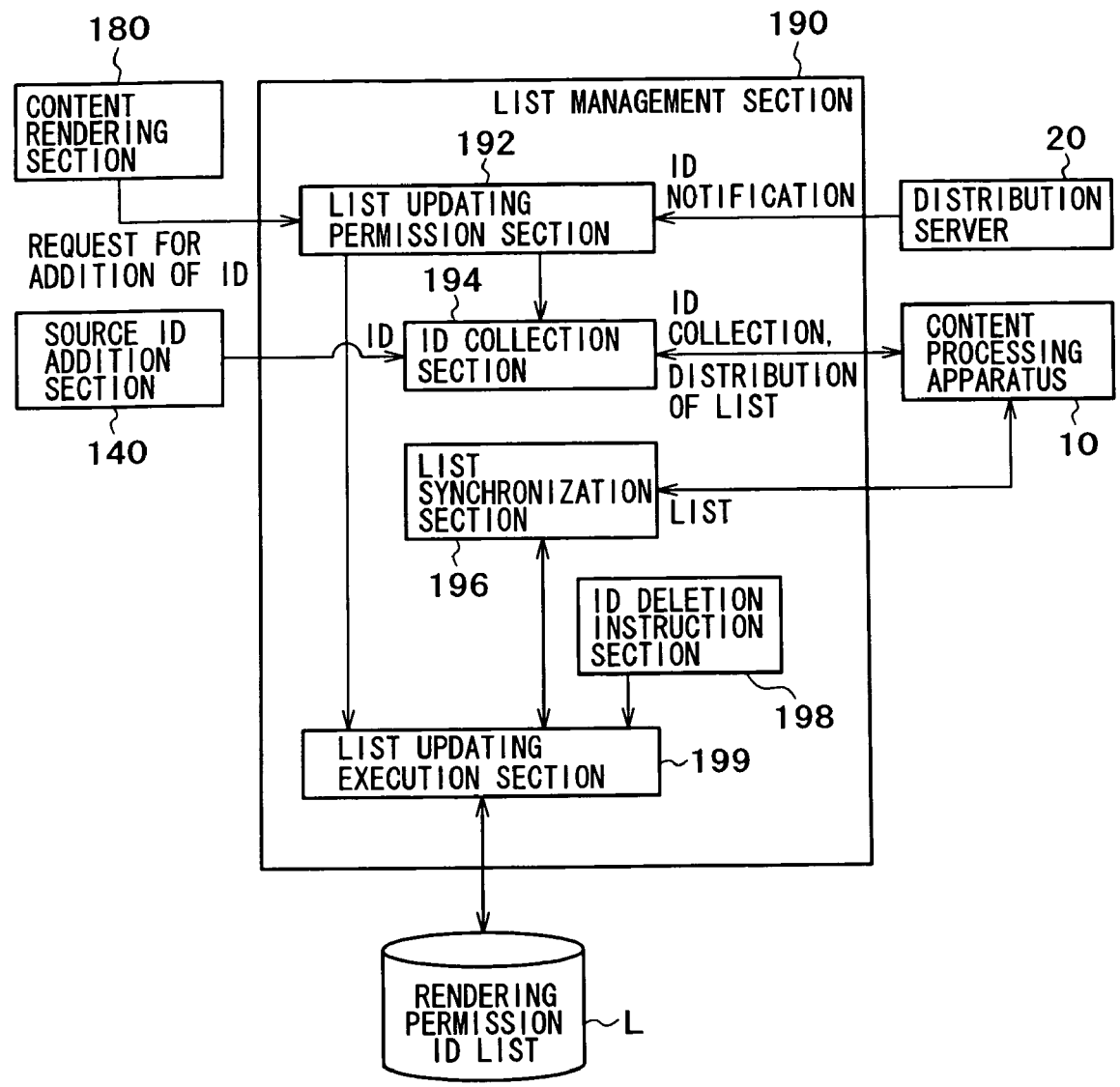

FIG. 8A

| SOURCE ID | ID ADDITION REQUESTING SOURCE | ID ADDITION PERMISSION SOURCE | DATE AND HOUR OF ADDITION |
|---|---|---|---|
| 1234-567890 | 43.11.124.2 | 43.11.124.1 | 2003-09-10 |
| 1234-789012 | 43.11.124.3 | 43.11.124.1 | 2003-09-11 |
| ⋮ | ⋮ | ⋮ | ⋮ |

FIG. 8B

```
# Source ID, Play System, Share System, Share Since, Flag
---source id list version 1 start---
1234-567890, 43.11.124.2, 43.11.124.1, 2003-09-10, 7
1234-789012, 43.11.124.3, 43.11.124.1, 2003-09-11, 1
---source id list version 1 end---

# Signature
Signature=70A7EFADA219B94202A7CB7D56CF02D3255E021500D
08A51A238F0E4CCB9CC9DBB5BB4439A213A53
```

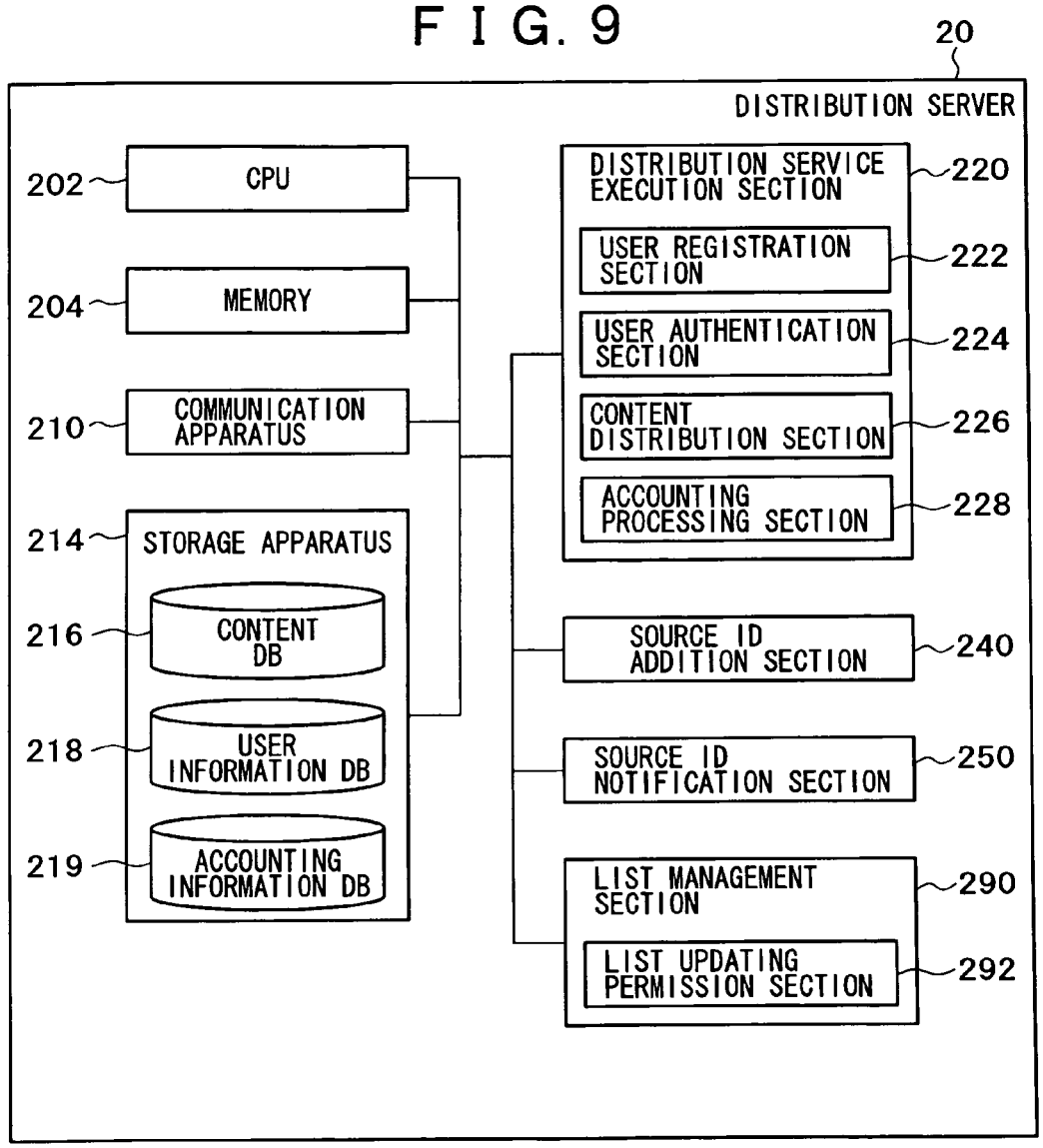

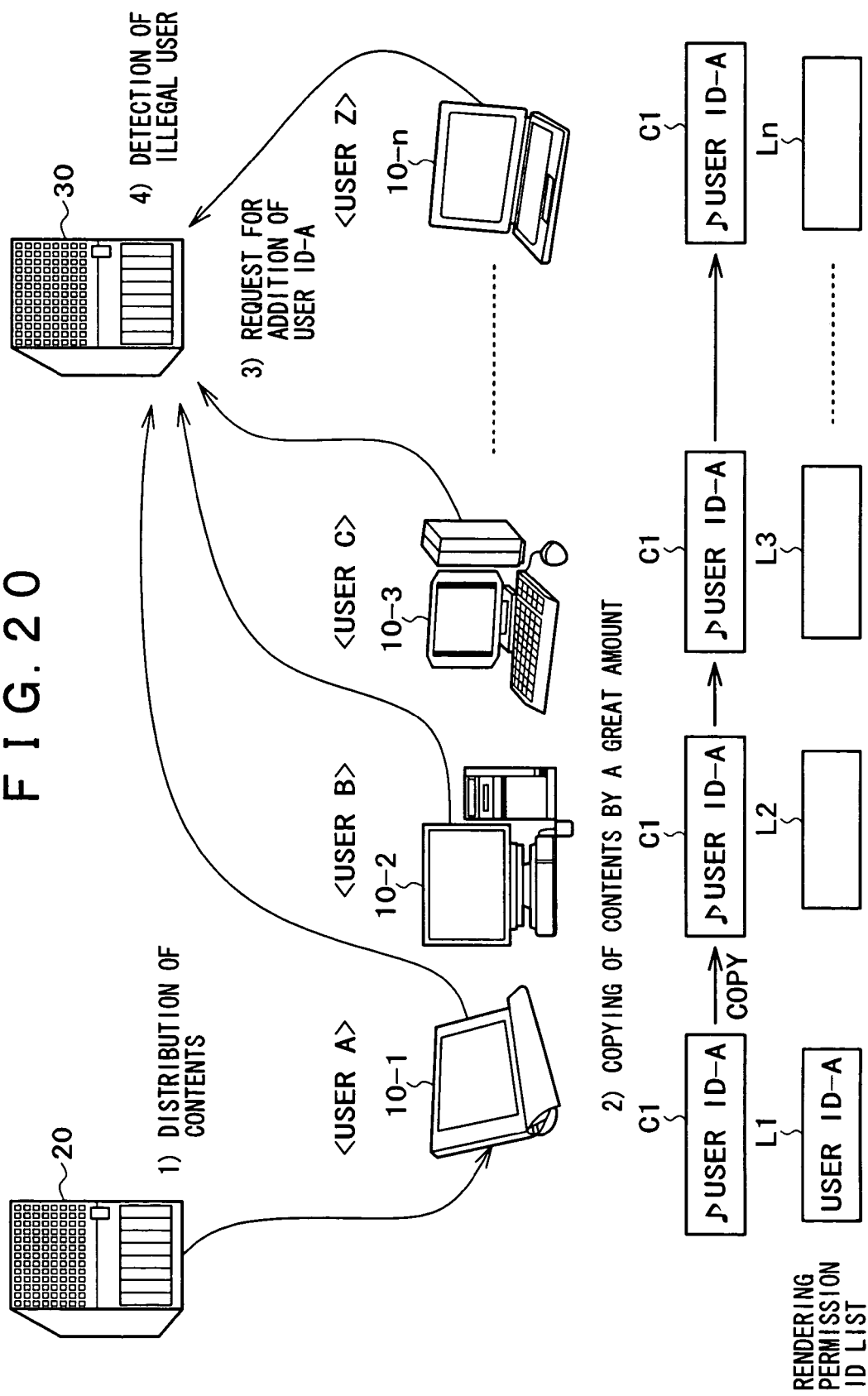

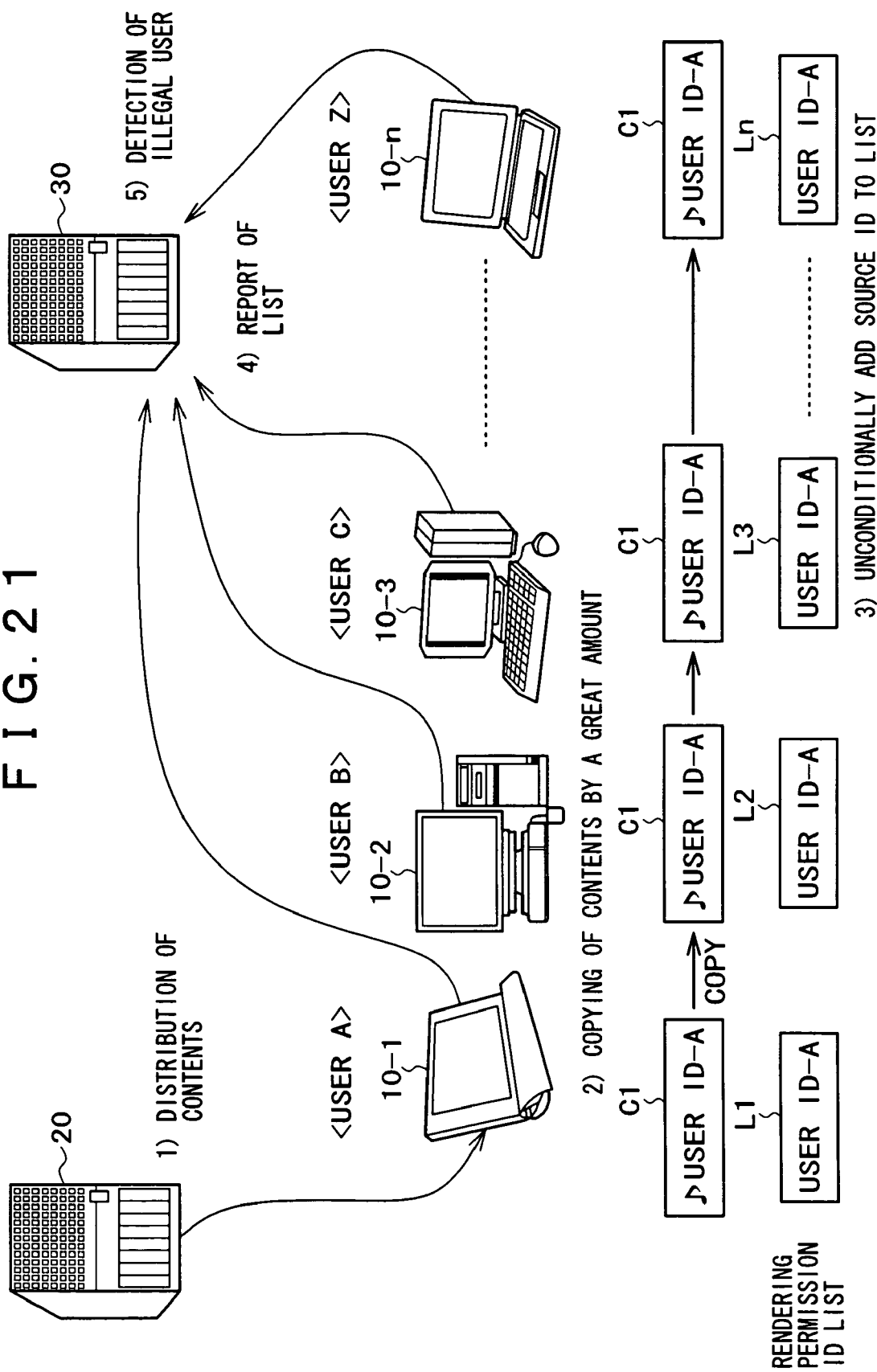

CONTENT SHARING SYSTEM; CONTENT PROCESSING APPARATUS; INFORMATION PROCESSING APPARATUS; PROGRAM; RECORDING MEDIUM; AND CONTENT SHARING METHOD

BACKGROUND OF THE INVENTION

This invention relates to a content sharing system wherein content data are shared between a plurality of content processing apparatuses.

Different from conventional analog content, digital content of music and so forth can be copied multiple times without suffering from any quality deterioration. Therefore, in recent years, with the progress of the popularization of the Internet and the increase in speed of operation and capacity of personal computers, illegal distribution, exchange, and so forth of content without its copyright owner's permission is increasing.

In order to prevent such illegal actions, a copyright management system, which utilizes a DRM (Digital Rights Management) technique that places limitations on the distribution and utilization of content, is being popularized. In a copyright management system of the type described, usually the number of copies of original content items is managed strictly to limit illegal copying, as proposed in the SDMI (Secure Digital Music Initiative) and so forth. One such copyright management system is disclosed in Japanese Patent Laid-Open No. 2003-296486 (hereinafter referred to as Patent Document 1).

Such a copyright management system, wherein the number of copies of original content items is managed strictly as described above, adopts such a configuration that an apparatus such as a content user's personal computer is connected to a management server when content is copied. The content management server manages the total number of copies and permits/rejects content item copying. Therefore, the performance of the content user's apparatus, the form of interconnection of a plurality of apparatuses, and so forth, are restricted. Besides, a copyright management process must be executed every time copying of content is performed, which is inefficient. Accordingly, the degree of content utilization freedom is low, and to a legal user of content (that is, to a person who pays a reasonable consideration to a content producing person and utilizes the content within a range of private use) the copyright management system design freedom is low and is inconvenient, particularly in a case where content is shared between a plurality of apparatuses.

Further, it is generally considered that people prefer a conventional communication system of analog content, which acknowledges limitless copying as long as the content is utilized for private use, to a system that strictly manages the total number of copies. Therefore, a digital content management system that provides the benefits of an analog content system is desired.

SUMMARY OF THE INVENTION

It is an object of the present invention to provide a content sharing system that can efficiently execute copyright management for limiting illegal utilization of contents, and can promote the degree of freedom in utilization of contents within a legal range of private utilization.

In order to attain the object described above, in accordance with an aspect of the present invention, there is provided a content sharing system, including a plurality of content processing apparatuses by which content data are shared; a content providing side one of the content processing apparatuses including: a source ID addition section for adding a source ID for specifying a providing source of content data to the content data, and a content providing section for providing, to a content acquiring side one of the content processing apparatus, the content data having the source ID added thereto; the content acquiring side content processing apparatus including a content acquiring section for acquiring, from the content providing side content processing apparatus, the content data having the source ID added thereto, and including a content rendering section having a rendering permission ID list including source IDs added to content data whose rendering is permitted for limiting, based on the source ID added to the acquired content data and the rendering permission ID list, rendering of the content data acquired by the content acquisition section rendering; and a list management section for permitting updating of the rendering permission ID list.

With the content sharing system, content data shared by the plural content processing apparatus can be managed in a measurement of a providing source of content data (in a measurement of a user or a measurement of an apparatus of a content providing source), and rendering of content data by the content acquiring side content processing apparatus can be limited depending upon the content providing source. Consequently, sharing of content data between the plural content processing apparatuses can be permitted/rejected in a measurement of a content providing source to perform copyright management.

In accordance with another aspect of the present invention, there is provided a content processing apparatus that shares content data with an external apparatus, including a source ID addition section for adding, to the content data, a source ID for specifying a providing source of content data, and a content providing section for providing, to the external apparatus, the content data having the source ID added thereto by the source ID addition section.

With the content processing apparatus, where content data is shared between the content providing apparatus and an external apparatus, the content providing apparatus that serves as a content providing side apparatus can embed, in the content data, a source ID corresponding to a content providing source of the content data. Consequently, the external apparatus, which serves as a content acquiring side apparatus, can, based on the source ID added to the content data, specify the providing source of the content data. Accordingly, the content data shared between the content providing apparatus and the external apparatus can be managed in a measurement of a content providing source.

In accordance with a further aspect of the present invention, there is provided a content processing apparatus that shares content data with an external apparatus, including a content acquiring section for acquiring, from the external apparatus, content data having a source ID added thereto for specifying a providing source of content data, and a content rendering section having a rendering permission ID list including source IDs added to content data whose rendering is permitted for limiting, based on the source ID added to the acquired content data and the rendering permission ID list, rendering of the content data acquired by the content acquisition section rendering.

With the content processing apparatus, where content data is shared between the content providing apparatus and an external apparatus, the content providing apparatus that serves as a content acquiring side apparatus is enabled/disabled, based on a providing source of the acquired content data, for rendering of the content data. For example, rendering of content data from an illegal content providing source is disabled. Since rendering of content data by the content processing apparatus serving as a content data acquiring side apparatus is enabled/disabled based on the rendering permission ID list representative of content providing sources permitted for sharing in this manner, sharing of content data between the content data providing and acquiring side apparatuses can be limited to execute copyright management.

In accordance with a still further aspect of the present invention, there is provided an information processing apparatus, including a list management section for permitting updating of a rendering permission ID list of source IDs each for specifying a providing source of content data, the rendering permission ID list including a source ID added to content data whose rendering, by a content rendering section of a content processing apparatus, is permitted.

With the information processing apparatus, where content data are shared between a plurality of content processing apparatuses, updating of the rendering permission ID list of each of the content processing apparatus is permitted. The information processing apparatus can thereby permit/reject rendering of the content data by the content processing apparatus in a measurement of a content providing source.

In accordance with a yet further aspect of the present invention, there is provided a program for causing a computer to execute a step of adding, to content data, a source ID for specifying a providing source of the content data.

In accordance with a yet further aspect of the present invention, there is provided a program for causing a computer to execute a step of limiting, based on a rendering permission ID list that includes source IDs added to content data whose rendering is permitted and a source ID added to the content data, rendering of content data rendering.

In accordance with a yet further aspect of the present invention, there is provided a program for causing a computer to execute a step of permitting updating of a rendering permission ID list of source IDs each for specifying a providing source of content data, the rendering permission ID list including a source ID added to content data whose rendering, by a content rendering section of a content processing apparatus, is permitted.

In accordance with a yet further aspect of the present invention, there is provided a recording medium for being read by a content processing apparatus by which content data is rendered, the recording medium having recorded thereon content data to each of which is added a source ID for specifying a providing source of the content data, and a rendering permission ID list including source IDs attached to content data whose rendering by the content production apparatus is permitted. With the recording medium, if a content processing apparatus that can handle the recording medium reads out the rendering permission ID list together with the content data, then it can render only the content data to which is added the source ID that is included in the rendering permission ID list. Consequently, the recording medium can be provided in a form wherein it is provided with a copyright management function.

In accordance with a yet further aspect of the present invention, there is provided a content sharing method for sharing content data between a plurality of content processing apparatuses. The content sharing method includes: a source ID addition step, executed by a content providing side one of the content processing apparatuses, of adding, to the content data, a source ID for specifying a providing source of content data; a content providing step, executed by the content providing side content processing apparatus, of providing, to a content acquiring side one of the content processing apparatuses, the content data having the source ID added thereto; and a content rendering step, executed by the content acquiring side content processing apparatus, of limiting, based on a rendering permission ID list including source IDs added to content data whose rendering is permitted and the source ID added to the provided content data, rendering of the content data provided by the content providing step rendering.

In summary, in accordance with the present invention, sharing of content data can be managed in a measurement of a providing source of content data. Therefore, copyright management for limiting illegal utilization of content can be executed efficiently. Further, within a range of legal private utilization, the degree of freedom in utilization of content can be increased.

The above and other objects, features, and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 5 is a schematic view showing a particular example of a source ID in one embodiment of the present invention;

FIG. 7 is a block diagram schematically showing a configuration of a list management section shown in FIG. 6;

FIG. 8A is a data table illustrating an example of a configuration of a rendering permission ID list managed by the list management section of FIG. 7, and FIG. 8B is a view illustrating an example of a data structure of the rendering permission ID list of FIG. 8A;

FIG. 9 is a block diagram schematically showing a configuration of a distribution server shown in FIG. 3;

FIGS. 19, 20, and 21 are diagrammatic views illustrating application examples 1, 2, and 3 of the content sharing system in accordance with the second embodiment of the present invention, respectively.

DETAILED DESCRIPTION OF THE PREFERRED EMBODIMENTS

First Embodiment

Figure 1:
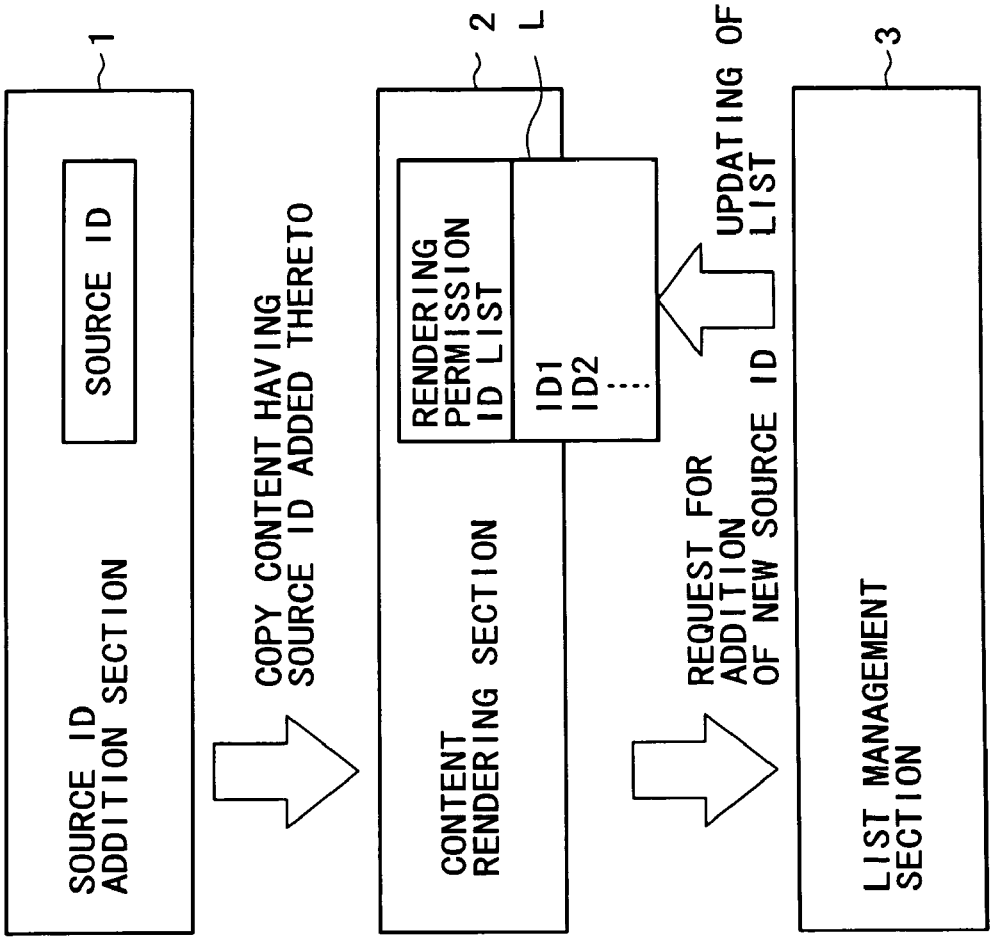
FIG. 1 is a block diagram showing principal components of a content sharing system in accordance with one embodiment of the present invention.

A content sharing system in accordance with a first embodiment of the present invention is described below.

1. OUTLINE

First, an outline of the content sharing system according to the present embodiment is described.

The content sharing system in accordance with the present embodiment is configured as a copyright management system for managing content sharing between a plurality of content processing apparatuses. The content sharing system is intended to prevent illegal utilization of content, such as distributing a great amount of content through the Internet or similar network, and to limit content sharing between content processing apparatuses of many and unspecific users. At the same time, to raise the degree of freedom in content utilization, the content sharing system permits a user, or the user's family, friends, or the like, to share content comparatively freely between a plurality of content processing apparatuses.

In a conventional copyright management system, such as the Check out/Check in system of the SDMI, the number of copies is managed for each individual "in terms of content measurement" to restrict illegal content utilization. The system, however, has a drawback that, since a copyright management process must be performed every time a content measurement is copied between content processing apparatuses, the system has a complicated configuration, low processing speed, and has low content use freedom within the range of legal private use.

In contrast, a content sharing system in accordance with the present embodiment is characterized in that the measurement of content use management is a measurement of a "content data providing source" (more particularly, a "measurement of a content data owner", a "measurement of an apparatus by which content data is recorded", or the like), and in that it performs a copyright management process of permitting/rejecting content data rendering by using an acquiring side content processing apparatus that depends upon a source providing the content data.

As used herein and as made clear in the description below, the word "rendering", and other words including and based on the root word "render", means in a general sense the reconstitution, or reconstruction, or recreation, or restoration, and the like, of the content data into a form suitable for output processing, and it does not mean copying in the sense of making of a duplicate.

In particular, a content sharing system in accordance with the present embodiment performs copyright management by managing content shared within the system in a measurement of a content data providing source, and it limits content data rendering on an acquiring side content processing apparatus.

It is to be noted that the content relating to the present embodiment includes any content such as, for example, video content (including still pictures or moving pictures that form a movie, a television program, a video program, photographs, pictures, figures, and the like), audio content, such as music and a radio program, electronic books (E-books), software, and so forth. Further, the content data are digital data and so forth representative of the substances of the various content mentioned above, and may be, for example, video data, audio data, electronic book data, and software data.

Now principal components of the content sharing system in accordance with the present embodiment for performing copyright management of such content as described above are described with reference to FIG. 1.

Referring to FIG. 1, a content sharing system in accordance with the present embodiment includes a source ID addition section 1, a content rendering section 2, and a list management section 3 as principal components thereof.

The source ID addition section 1 is provided incidentally to a content data recording machine, recording software for a personal computer or the like, in a content processing apparatus or the like on the content providing side. The source ID addition section 1 has a unique source ID in a measurement of a providing source of content data and has a function of adding the source ID to content data upon new production or distribution of such content data.

Here, the term "providing source of content data" (hereinafter referred to simply as "content providing source") signifies an apparatus, software, or a user that serves as a distribution source for content data that is shared within the content sharing system on the personal user level. More particularly, the content providing source may be (1) a user who makes use of a content distribution service to acquire (purchase or the like) content, or a content processing apparatus used by the user; or (2) a content processing apparatus on which content is newly produced by ripping, self recording, or the like, or a user of the content processing apparatus, or the like. Further, the source ID is an ID given uniquely to each such content providing source, and a content providing source can be specified with such source ID.

Content data, to which the source ID is added by the source ID addition section 1, is copied from a content processing apparatus on the content providing side to another content processing apparatus on the content acquiring side. It is to be noted that upon copying of such content data, a copy limitation process based on the total number of copies as is used in a conventional copyright management system is not used. Accordingly, content data can be copied freely between a plurality of content processing apparatuses.

The content rendering section 2 is a content data rendering machine or rendering software for a personal computer provided in a content processing apparatus on the side on which content is to be acquired and utilized. The content rendering section 2 has a rendering permission ID list L, which is a list of source IDs with regard to which rendering of content data is permitted by the content rendering section 2. The rendering permission ID list L is provided for each one content rendering section 2, and different content rendering sections 2 have different source IDs included in their rendering permission ID lists L for permission of rendering.

When any of the content data to which the source ID is added is to be rendered, the content rendering section 2 checks the rendering permission ID list L to enable/disable rendering of the content data. In particular, if the source ID added to the content data is included in the rendering permission ID list L, then the content rendering section 2 can render the content data. On the other hand, if the source ID added to the content data is not included in the rendering permission ID list L, then the content rendering section 2 cannot render the content data. In this manner, the content rendering section 2 limits rendering of content data by a measurement of a source ID, that is, by a measurement of a content providing source.

Further, the content rendering section 2 can issue a request, for example, to the list management section 3, for permission of addition of a new source ID to the rendering permission ID list L included therein. In particular, in order for the content rendering section 2 to render content data to which is added a new source ID that is not included in the rendering permission ID list L thereof, it is necessary to add the new source ID to the rendering permission ID list L. To this end, the content rendering section 2 issues to the list management section 3, which permits updating of the rendering permission ID list L, a request for permission of addition of the new source ID rendering.

The list management section 3 has a function of permitting updating of the rendering permission ID list L in response to a request from the content rendering section 2, or spontaneously. Here, the updating of the rendering permission ID list L signifies addition, deletion, or change of a source ID in the rendering permission ID list L. The list management section 3 can add/delete a source ID to/from the rendering permission ID list L so as to permit/reject rendering in the content rendering section 2 of the content data to which the source ID is added rendering. Accordingly, by controlling the updating process of the rendering permission ID list L by the list management section 3, sharing control of content data between a plurality of content processing apparatuses, or management of content owners, can be implemented.

Figure 2:
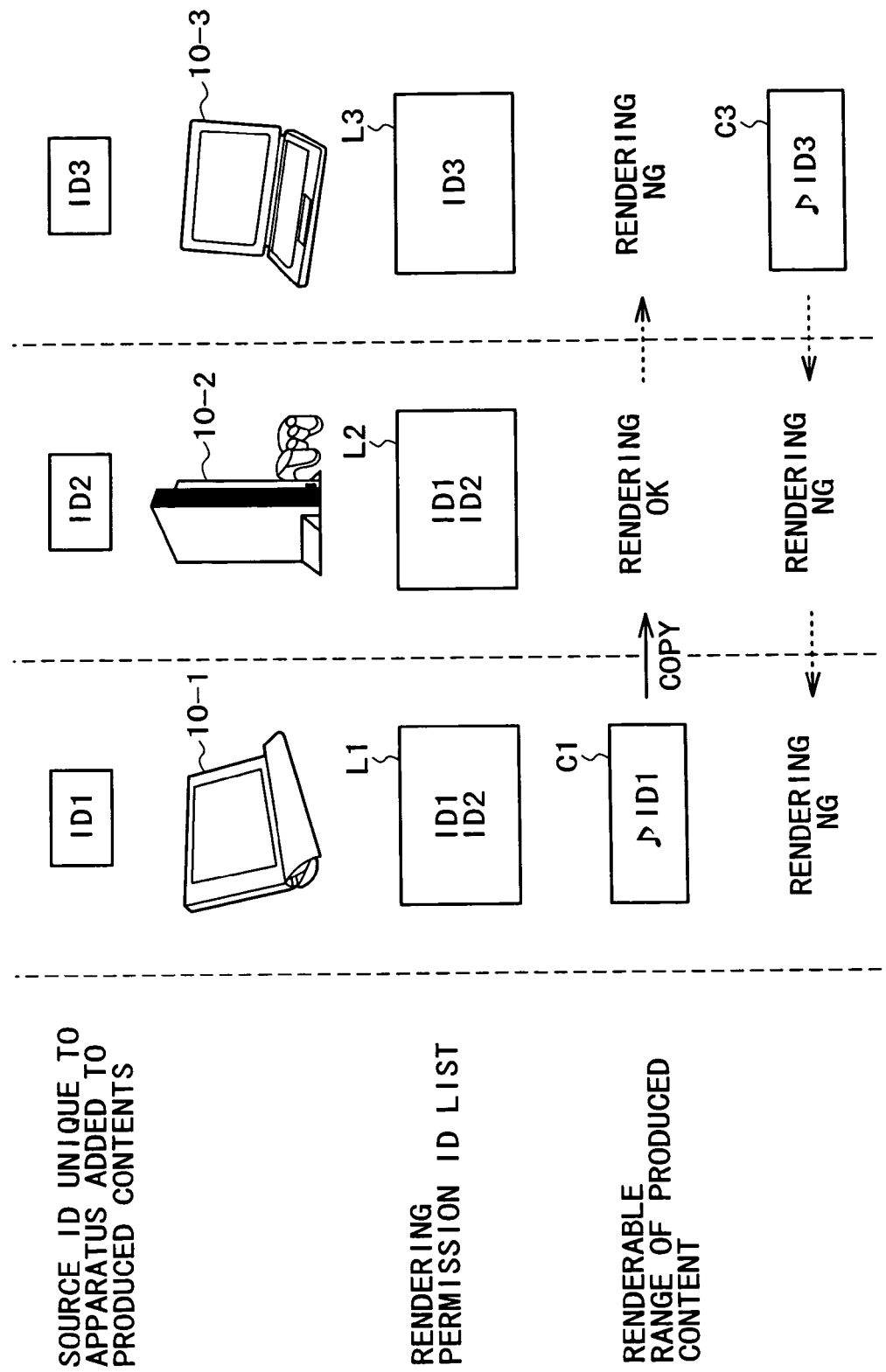
FIG. 2 is a schematic diagrammatic view showing a particular example wherein content data are shared by three content processing apparatuses in the content sharing system shown in FIG. 1.

A particular example wherein such a content sharing system that includes the source ID addition section 1, content rendering section 2, and list management section 3, as described above, shares content data is described with reference to FIG. 2.

The content sharing system shown includes three content processing apparatuses 10-1, 10-2, and 10-3. Each of the content processing apparatuses 10-1, 10-2, and 10-3 includes the source ID addition section 1, content rendering section 2, and list management section 3, described above.

The content processing apparatuses 10-1, 10-2, and 10-3 have unique source IDs ID1, ID2, and ID3 allocated thereto, respectively. If new content is produced by any of the content processing apparatuses 10-1, 10-2, and 10-3, then the source ID addition section 1 thereof adds the respective source ID ID1, ID2, or ID3 to the produced content data and records the content data with the source ID.

The content production sections 2 of the content processing apparatuses 10-1, 10-2, and 10-3 have rendering permission ID lists L1, L2, and L3, respectively. In particular, the rendering permission ID list L1 of the content processing apparatus 10-1 and the rendering permission ID list L2 of the content processing apparatus 10-2 each include the source ID ID1, corresponding to the content processing apparatus 10-1, and the source ID ID2, corresponding to the content processing apparatus 10-2. Hence the content processing apparatuses 10-1 and 10-2 mutually share the source IDs ID1 and ID2. Meanwhile, the rendering permission ID list L3 of the content processing apparatus 10-3 includes only the source ID ID3, corresponding to the content processing apparatus 10-3 itself, and does not include the other source IDs ID1 and ID2.

In such an instance as described above, the source ID ID1 is added to content data C1 produced by the content processing apparatus 10-1. The content data C1 to which the source ID ID1 is added can be rendered by the content processing apparatus 10-2 because the source ID ID1 is included in the rendering permission ID list L2. But the content data C1 cannot be rendered by the content processing apparatus 10-3 because the source ID ID1 is not included in the rendering permission ID list L3. On the other hand, content data C3 produced by the content processing apparatus 10-3, having the source ID ID3 added thereto, cannot be rendered by the content processing apparatus 10-1 and 10-2 because the source ID ID3 is not included in either of the rendering permission ID lists L1 and L2.

In this manner, the content processing apparatus 10-1 and the content processing apparatus 10-2 can mutually render content data produced by either of them, since the source IDs ID1 and ID2 are shared, and they are permitted to share content data. On the other hand, the content processing apparatus 10-1 and the content processing apparatus 10-3 cannot mutually render content data produced by either of them because the source IDs ID1 and ID3 are not shared, and therefore they are limited in sharing of content data.

An outline of the content sharing system in accordance with the present embodiment is described above. In the following, the content sharing system in accordance with the present embodiment and a particular configuration of components of the system are described in detail.

2. SYSTEM CONFIGURATION

Figure 3:
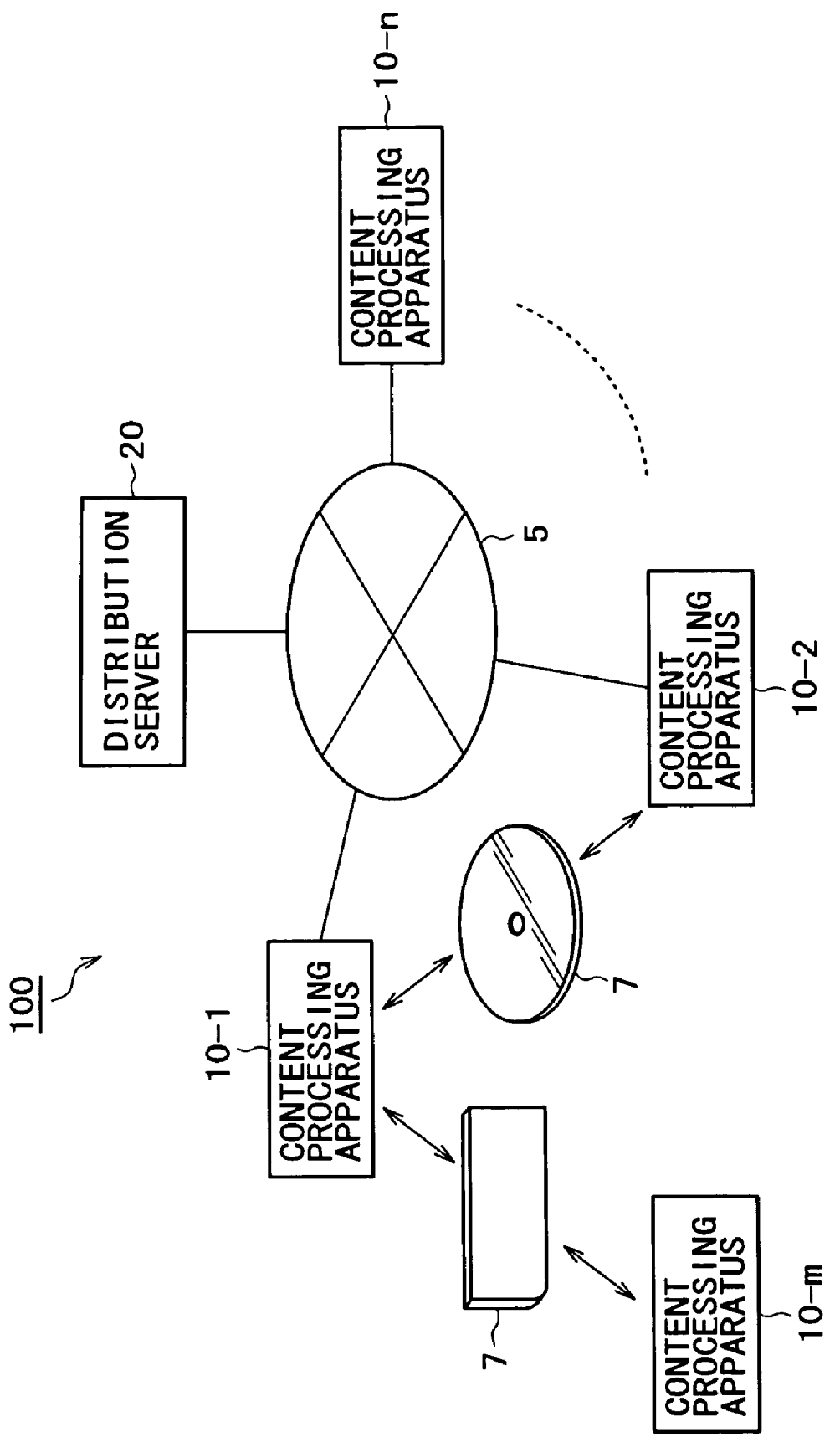
FIG. 3 is a block diagram schematically showing a general configuration of the content sharing system in accordance with one embodiment of the present invention.

First, a general configuration of the content sharing system according to the present embodiment is described with reference to FIG. 3.

The content sharing system 100 in accordance with the present embodiment includes a plurality of content processing apparatuses 10-1, 10-2, . . . , 10-n (which may be hereinafter referred to generally as "content processing apparatuses 10"), a distribution server 20, a network 5 for interconnecting the content processing apparatuses 10 and the distribution server 20, and a recording medium 7.

The content processing apparatuses 10 may be any of various recording and rendering apparatuses, recording apparatuses for recording only, or rendering apparatuses for rendering only, which can record/render content data of video images, sound, and so forth, onto or from the recording medium 7 or a storage apparatus built therein. More particularly, the content processing apparatuses 10 may be any of, for example, computer apparatuses (notebook type, desktop type, and so forth) such as personal computers, PDAs (Personal Digital Assistants), portable video players/recorders, portable audio players/recorders such as IC recorders, image pickup apparatus such as digital cameras and video recorders, game machines for home use, VTRs, CD or DVD recorders/players, radio apparatuses, portable telephone sets, PHS terminals, information appliances, and so forth.

The content processing apparatuses 10 can produce and record content data newly, for example, by self recording (recording of sound or/and images), ripping, or the like. It is to be noted that self recording signifies to record, as sound data/image data, sound/images collected/picked up by means of a sound collecting apparatus or an image pickup apparatus of the content processing apparatus 10 itself. Meanwhile, ripping signifies to extract content data (sound data, image data, and so forth) of the digital type recorded on a recording medium such as a music CD, a video DVD, or the like, to convert the content data into data in a file format that can be processed by a computer apparatus, and to record the data in the file format. Further, the content processing apparatuses 10 can record content data distributed from the distribution server 20 onto recording means such as the storage apparatus or the recording medium 7.

Further, each content processing apparatus 10 can transmit and receive content data produced or distributed in such a manner as described above to and from another one of the content processing apparatuses 10 via the network 5, or can exchange such content data via the recording medium 7. Consequently, the content data can be provided/acquired by and shared between a plurality of content processing apparatuses 10.

Further, the content processing apparatuses 10 can render content data produced or distributed in such a manner as described above. Furthermore, the content processing apparatuses 10 can render content data acquired from another content processing apparatus 10 if the content data is permitted for rendering.

It is to be noted that the content processing apparatuses 10 in accordance with the present embodiment include components that correspond, for example, to such a source ID addition section 1, content rendering section 2, and list management section 3 as described above, and each has a content data copyright management function as described below in detail.

The distribution server 20 is a server apparatus used for content distribution services, such as electronic music distribution (EMD), and is formed from a computer apparatus having a server function. The distribution server 20 can distribute content data to the content processing apparatuses 10, which are clients, via the network 5. When the distribution server 20 distributes music content, it can compress the content data, for example, in accordance with the MP3 (MPEG Audio Layer-3) method or the like, and distribute them as such. It is to be noted that, as described below in detail, the distribution server 20 in the present embodiment includes such components that, for example, correspond to the source ID addition section 1 and the list management section 3, as described above.

The network 5 is a communication network for interconnecting the plural content processing apparatuses 10 and the distribution server 20 for bidirectional communication. The network 5 may be formed from a public network such as, for example, the Internet, a telephone network, a satellite communication network, or a leased network such as a WAN, a LAN, or an IP-VPN, and may be any of wired and wireless networks.

Further, the network 5 includes a private network. The private network is a network that interconnects a plurality of content processing apparatuses 10 that share content data within the range of private use, as viewed from the point of view of copyright management. The private network of the type described may particularly be, for example, a network that interconnects a plurality of content processing apparatuses 10 used by the same user, a home network that interconnects a plurality of content processing apparatuses 10 used in the same home, or a LAN that interconnects a plurality of content processing apparatuses 10 used in a group of a limited scale (in a company, by friends, or the like).

The recording medium 7 is a removable medium into which various data such as content data can be stored, and it may be any of various optical disks, such as, for example, a DVD-R, a DVD-RAM, a CD-R, and a magneto-optical disk; magnetic disks, such as a flexible disk; a hard disk; and various semiconductor memories. It is to be noted that the recording medium 7 may be a recording medium with a copyright management function for limiting copy or rendering of content data, for example, using an encryption key.

The recording medium 7 functions as a providing/acquiring medium of content data between a plurality of content processing apparatuses 10. For example, by loading a recording medium 7, on which content data is written by the content processing apparatus 10-1, into the content processing apparatus 10-2 so as to read out the content data, the content data can be provided from the content processing apparatus 10-1 to the content processing apparatus 10-2. Further, the content processing apparatus 10-1 can provide/acquire content data to/from a content processing apparatus 10-m, which cannot be connected to the network 5, via the recording medium 7.

The content sharing system 100 having such a configuration as described above can share the same content data by providing and acquiring (that is, copying) the content data between a plurality of content processing apparatuses 10. Further, copyright management can be executed efficiently by permitting/rejecting, in a measurement of a content providing source, rendering of content data shared by the content processing apparatuses 10 measurement by means of the source ID addition section 1, content rendering section 2, and list management section 3 described above.

3. CONTENT PROCESSING APPARATUS

Figure 4:
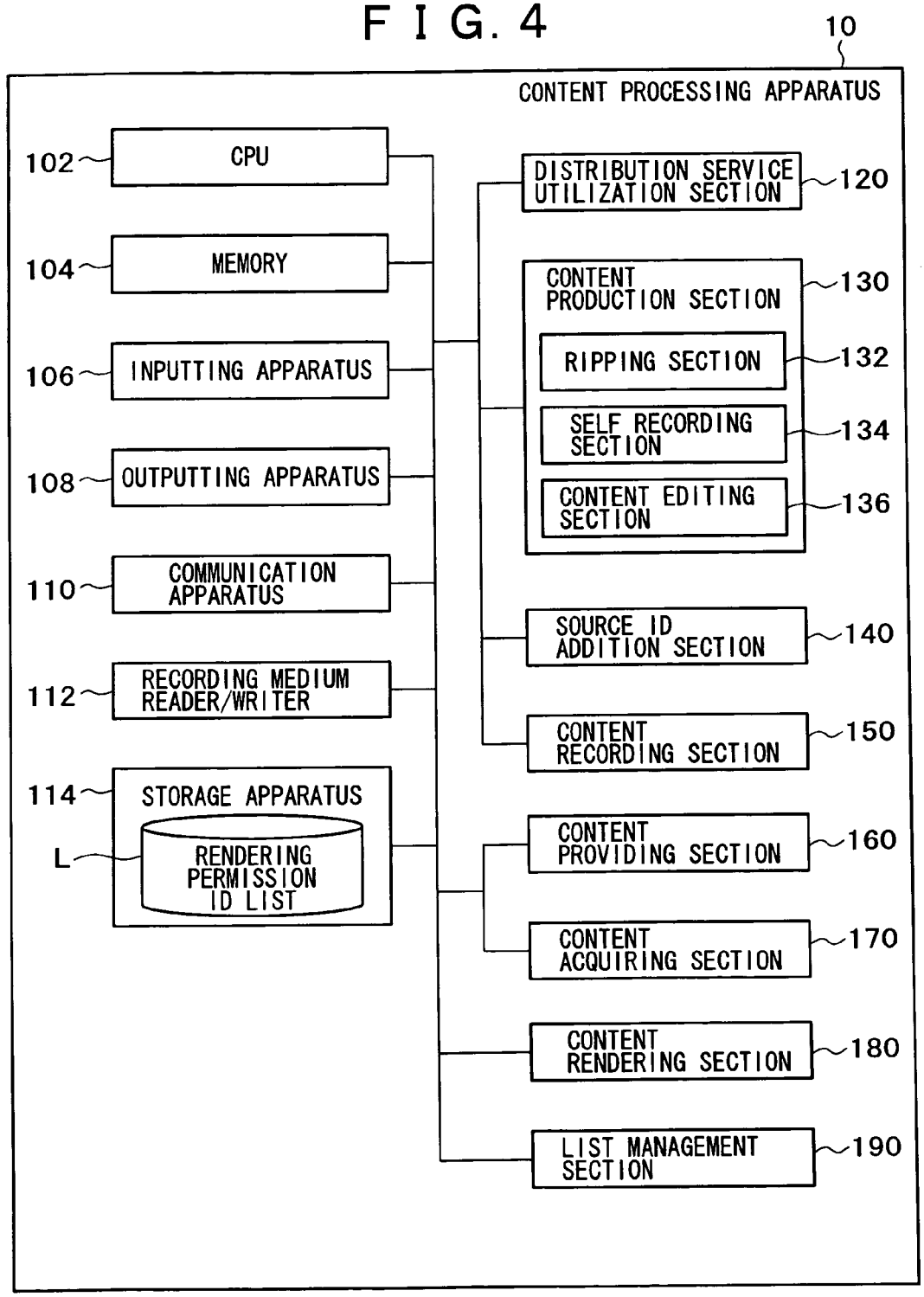
FIG. 4 is a block diagram schematically showing a configuration of the content processing apparatus shown in FIG. 2.

Now a configuration of the content processing apparatus 10 in accordance with the present embodiment is described with reference to FIG. 4.

The content processing apparatus 10 includes a CPU 102, a memory 104, an inputting apparatus 106, an outputting apparatus 108, a communication apparatus 110, a recording medium reader/writer 112, a storage apparatus 114, a distribution service utilization section 120, a content production section 130, a source ID addition section 140, a content recording section 150, a content providing section 160, a content acquiring section 170, a content rendering section 180, and a list management section 190.

The CPU 102 functions as an arithmetic processing apparatus and as a control apparatus, and it can control processes of the components in the content processing apparatus 10. The memory 104 is formed from, for example, a RAM, a ROM, or a cache memory, and it has a function of temporarily storing various data relating to processing of the CPU 102, operation programs for the CPU 102, and so forth.

The inputting apparatus 106 includes operation means such as, for example, a mouse, a keyboard, a touch panel, buttons, switches, and/or levers, an input control circuit for producing and outputting an input signal to the CPU 102, and so forth. The user of the content processing apparatus 10 can operate the inputting apparatus 106 to input various data and to provide instructions for processing operations to the content processing apparatus 10.

The outputting apparatus 108 includes a display apparatus such as, for example, a CRT display measurement or a liquid crystal display (LCD) panel, a sound outputting apparatus such as a speaker, and so forth. The outputting apparatus 108 can output content data rendered by the content rendering section 180 described below. More particularly, the display apparatus displays rendered image data while the sound outputting apparatus can output rendered sound data. It is to be noted that, if the content processing apparatus 10 is formed as a machine for exclusive content recording use, the outputting apparatus 108 need not necessarily be provided. Further, if the content data to be handled by the content processing apparatus 10 includes only sound data, the display apparatus is unnecessary, and if the content data includes only image data, the sound outputting apparatus is unnecessary.

The communication apparatus 110 is a communication interface formed from, for example, a communication line, a communication circuit, or a communication device. The communication apparatus 110 can, via network 5, transmit and receive various data such as content data, a rendering permission ID list L, and control signals to and from an external apparatus such as another content processing apparatus 10 or the distribution server 20. Further, the communication apparatus 110 can transmit and receive various data such as content data to and from a peripheral device connected to the content processing apparatus 10 by a wire such as, for example, a USB (Universal Serial Bus) cable or a SCSI (Small Computer System Interface) cable.

The recording medium reader/writer 112 is an apparatus that records/renders various data such as content data and a rendering permission list, for example, onto/from the recording medium 7. The recording medium reader/writer 112 is formed, for example, from a disk apparatus such as an optical disk drive if the recording medium 7 is an optical disk or the like, and from a reader/writer for a semiconductor memory if the recording medium 7 is a semiconductor memory. It is to be noted that the recording medium reader/writer 112 may be built into the content processing apparatus 10 or may be external to the content processing apparatus 10.

The storage apparatus 114 is an apparatus for storing data and is formed from, for example, a hard disk drive or a flash memory, and it can store various data such as programs and content data. Further, the storage apparatus 114 has stored therein the above-described rendering permission ID list L corresponding, for example, to the content rendering section 180. The rendering permission ID list L is stored in the storage apparatus 114 in an encrypted state or in a state wherein it has a signature added thereto in order to prevent, for example, falsification by a user. It is to be noted that the rendering permission ID list L may be stored not in the storage apparatus 114 but, for example, in the memory 104 or in the recording medium 7.

The distribution service utilization section 120 can receive, via the network 5 and the communication apparatus 110, content data distributed from the distribution server 20 (such content data is referred to below as "distribution content data"). In particular, if the user makes use of a content distribution service to purchase content data, then the distribution service utilization section 120 downloads the distribution content data from the distribution server 20. Further, the distribution service utilization section 120 can transmit and receive various kinds of information such as, for example, user authentication information necessary for the user to utilize the content distribution service, accounting information, and content distribution request information to and from the distribution server 20, and it can support inputting and outputting of such information. The distribution service utilization section 120 is formed, for example, by installing content distribution service software corresponding to a content distribution service to be utilized into the content processing apparatus 10. It is to be noted that the distribution service utilization section 120 may be provided for each of a plurality of content distribution services to be utilized by the user. That is, a plurality of such distribution service utilization sections 120 may be provided for the different content distribution services. When the distribution service utilization section 120 receives distribution content data, it outputs the data to the source ID addition section 140.

The content production section 130 can produce new content data. The content production section 130 includes, for example, a ripping section 132, a self recording section 134, and a content editing section 136.

The ripping section 132 can rip data recorded on a recording medium, such as a music CD or a DVD for an image. More particularly, the ripping section 132 controls the recording medium reader/writer 112, for example, based on user inputs to extract a file of music/image data from the recording medium and convert the file into another file in a file format for which the music/image data can be processed by the content processing apparatus 10 to produce content data. The ripping section 132 can be formed, for example, by installing software for ripping into the content processing apparatus 10.

The self recording section 134 can produce new content data by self recording of sound or images. The self recording section 134 is formed from, for example, a sound collecting apparatus such as a microphone, an image pickup apparatus such as a camera, a sound/image recording apparatus, and a recording control section for controlling the apparatuses mentioned. The self recording section 134 thus collects sound around the content processing apparatus 10 and/or picks up an image of an image pickup subject, for example, based on user inputs to produce sound data or image data and so forth, and it performs predetermined data processing for the data to produce new content data.

The content editing section 136 can edit (work, synthesize, connect, and so forth) one or more content data to produce new content data unique to the user. Further, the content editing section 136 can, based on user inputs for example, perform a plotting process to produce new image data, perform a composing process to produce new sound data, perform a document production process to produce new electronic book data, and produce new software formed from a program list. The content editing section 136 can be formed, for example, by installing software for content editing/production into the content processing apparatus 10.

Content data produced by the content production section 130 (such content data is referred to below as "production content data") is outputted to the source ID addition section 140.

The source ID addition section 140 is a component corresponding to the source ID addition section 1 described above with reference to FIG. 1. The source ID addition section 140 can add a source ID as described above to such distribution content data or to production content data as described above. Further, the source ID addition section 140 outputs the content data having the source ID added thereto to the content recording section 150. It is to be noted that details of the source ID addition section 140 are described below.

The content recording section 150 can control the storage apparatus 114 or the recording medium reader/writer 112 to record content data, to which a source ID is added by the source ID addition section 140, on the storage apparatus 114 or on the recording medium 7. Further, the content recording section 150 can similarly record also content data with a source ID acquired by the content acquiring section 170.

The content providing section 160 can provide content data having a source ID added thereto to an external content processing apparatus 10. The content acquiring section 170 can acquire content data with a source ID added thereto from an external content processing apparatus 10. The content providing section 160 and the content acquiring section 170 may execute providing/acquiring processes of content data with a source ID added thereto, for example, by transmission/reception via the network 5 or via the recording medium 7.

When the content data is to be provided/acquired via the network 5, the content providing section 160 functions as a content transmission section for transmitting the content data via the communication apparatus 110 and the network 5, and the content acquiring section 170 functions as a content reception section for receiving the content data via the network 5 and the communication apparatus 110.

On the other hand, when the content data is to be provided/acquired through the recording medium 7, the content providing section 160 functions as a content write control section that controls the recording medium reader/writer 112 to write the content data onto the recording medium, and the content acquiring section 170 functions as a content read control section that controls the recording medium reader/writer 112 to read out the content data from the recording medium, and functions as a content reception section for receiving the content data via the network 5.

The content rendering section 180 is a component that corresponds to the content rendering section 2 described above with reference to FIG. 1. The content rendering section 180 is formed from, for example, a rendering apparatus having a content rendering function or software for content rendering installed in the content processing apparatus 10, and it can render various kinds of content data. The content data rendered by the content rendering section 180 is output from the outputting apparatus 108.

The content rendering section 180 has a rendering permission ID list L corresponding thereto, for example, in the storage apparatus 114, and when content data to which a source ID is added is to be rendered, the content rendering section 180 is enabled/disabled to render the content data depending upon whether or not the source ID is included in the rendering permission ID list L.

It is to be noted that two or more content rendering sections 180 may be provided in one content processing apparatus 10. For example, two or more different pieces of software for content rendering are installed into one content processing apparatus 10, or two or more rendering apparatuses are provided, or else two or more content rendering sections 180 are formed in, one content processing apparatus 10.

In this instance, the rendering permission ID list L may be provided in a corresponding relationship to each of the plural content rendering sections 180. Thus, each of the two or more content rendering sections 180 can be enabled/disabled to render content data to which a source ID is added in accordance with the rendering permission ID list L included in the content rendering section 180. Alternatively, only one content processing apparatus 10 may include only one rendering permission ID list L such that the one content processing apparatus 10 is shared by a plurality of content rendering sections 180. Thus, in the same content processing apparatus 10, content data to which a source ID is added can be enabled/disabled for rendering in a concentrated manner irrespective of the content rendering section 180 that performs a rendering process.

The list management section 190 is a component corresponding to the list management section 3 described above with reference to FIG. 1. The list management section 190 has a function of updating the rendering permission ID list L included in the content rendering section 180 and stored, for example, in the storage apparatus 114. It is to be noted that details of the list management section 190 are described below.

The content processing apparatus 10 includes such components as described above. It is to be noted that, depending upon the type of the content processing apparatus 10, the content processing apparatus 10 may not necessarily include all of the components described above. For example, if the content processing apparatus 10 is a machine for rendering only, it may not include, for example, the distribution service utilization section 120, content production section 130, source ID addition section 140, content recording section 150, and content providing section 160. On the other hand, if the content processing apparatus 10 is a machine for recording only, it need not include, for example, the content acquiring section 170, content rendering section 180, and list management section 190.

Further, the distribution service utilization section 120, content production section 130, source ID addition section 140, content recording section 150, content providing section 160, content acquiring section 170, and content rendering section 180 may be formed as hardware having the functions described above or may otherwise be formed as software having the functions described above and installed in the content processing apparatus 10.

4. SOURCE ID ADDITION SECTION

Now the source ID addition section 140, which is one of characteristic components of the present embodiment, is described. As described above, the source ID addition section 140 has a function of embedding, into content data, a source ID that is representative of a content providing source of the content data. In the following description, a source ID is described first, and then the source ID addition section 140 is described in detail.

A source ID is an identification code given uniquely to each providing source of content data, as described above. More particularly, the source ID is given uniquely, for example, to a "measurement of a content processing apparatus 10", a "measurement of an application in a content processing apparatus 10", a "measurement of a user of a content processing apparatus 10", a "measurement of a user (user account) of a content distribution service", or the like.

In particular, where a source ID is given in a measurement of an application in a content processing apparatus 10, for example, a different source ID is used for a different content processing apparatus 10, and a different source ID is used for a different sound/image recording application installed in the content processing apparatus 10. On the other hand, where a source ID is given in a measurement of a user of a content distribution service, for example, a different source ID is used for a different content distribution service, and a different source ID is used for a different user of the content distribution service. Here, a particular example of a configuration of the source ID in the present embodiment is described with reference to FIG. 5.

As seen in FIG. 5, the source ID shown is formed, for example, as a numerical (0 to 9) value having 10 digits. Among the 10 digits, the higher order four digits (first to fourth digits) form a "genre code" representative of an attribute of the content data, and the lower order six digits (fifth to tenth digits) form a "unique ID" measurement unique to each content providing source.

The "genre code" represents, for the content data to which a source ID is added, content data attribute information such as content data type information ("content type code") or providing source type information ("content production source type code", "company and service type code").

More particularly, the "content type code" of the first digit is a code representative of the type of content data to which the source ID is added. This code indicates that, if it is "0", then the content data is sound content; if it is "1", then the content data is image content; if it is "2", then the content data is electronic book content; and if it is "3", then the content data is software content.

The "content production source identification code" of the second digit is a code representative of the type of the production source of content data to which the source ID is added. This code indicates that, if it is "0", then the content data has been produced by self recording or the like of the content processing apparatus 10; but if it is "1", then the content data has been distributed by a content distribution service.

The "company and service type code" of the third and fourth digits is a code representative of the types of content distribution services and companies that have distributed the content data to which the source ID is added. If this code is "0", then it indicates that the content data has been distributed by an "α service managed by an A company".

It is to be noted that, though not shown, a "content providing source type code", which represents the type of a providing source of content data to which the source ID is added (that is, the type of the source ID), may be added to the genre code. In particular, the code may be set such that, for example, if it is "0", then the content providing source is the "content processing apparatus 10"; if it is "1", then the content providing source is the "user of the content processing apparatus 10"; and if it is "2", then the content providing source is the "user of the content distribution service". Where the "content providing source type code" is provided, the type of the providing source of the content data can be identified readily.

Where such a genre code as described above is included in the source ID, the type of the content data and the providing source of the content data can be identified and classified efficiently with certainty based on the source ID.

The "unique ID" of the fifth to tenth digits is an ID unique in the same genre code, and it is allocated individually to each of such content providing sources as described above. The providing source of the content data can be specified particularly based on such a unique ID as described above.

Now the source ID addition section 140 is described. The source ID addition section 140 can add such a source ID as described above to content data. In the following description, the types of the source ID to be added by the source ID addition section 140, the timing of addition of the source ID, and a source ID adding method are described individually.

First, the types of the source ID to be added by the source ID addition section 140 are described. The types of the source ID are classified in a measurement of addition of a source ID ("measurement of a content processing apparatus 10", "measurement of a user account of a content distribution service", or the like) and represent types of content providing sources. The source ID addition section 140 has a plurality of different source IDs to be added to content data in advance. The source IDs include, for example:

(1) one source ID corresponding to the content processing apparatus 10 in which the source ID addition section 140 is provided (source ID of a "measurement of a content processing apparatus 10");

(2) one or more source IDs individually corresponding to one or more applications for content production in the content processing apparatus 10 (source ID of a "measurement of an application in the content processing apparatus 10");

(3) one source ID corresponding to the user of the content processing apparatus 10 (source ID of a "measurement of a user of the content processing apparatus 10");

(4) one source ID corresponding to a user account of a content distribution service in which the content processing apparatus 10 is utilized (source ID of a "user account of a content distribution service"); and so forth.

The source ID addition section 140 includes a content identification section (not shown) for identifying the type of content data and a source ID selection section (not shown) for selecting a source ID to be added in accordance with the type of content data identified by the content identification section. It is to be noted that the types of content data include not only types of the substance of content data, such as music data and image data as described above, but also types of the content data production source, such as distribution content data and production content data.

The source ID addition section 140 selects, for example, by means of the source ID selection section, a suitable one of the source IDs (1) to (4) provided in a plurality of measurements, as described above, in response to the type of content data of an object of addition of the source ID, and adds the selected source ID to the content data.

For example, if content data of an object of addition of a source ID is production content data produced (by ripping, self recording, or the like) by the content production section 130 of the content processing apparatus 10, then the source ID addition section 140 preferably adds a source ID of the paragraph (1) above. Consequently, the providing source of the content data produced by the content processing apparatus 10 can be set to the content processing apparatus 10 itself.

On the other hand, if the content data of an object of addition of a source ID is distribution content data, the source ID addition section 140 preferably adds a source ID of the paragraph (4) above. Consequently, the providing source of the distribution content data can be set to a user of a content distribution service.

In this manner, the source ID addition section 140 adds, for example, to production content data, a source ID of the content processing apparatus 10 that is the production source of the production content data, but it adds to distribution content data a source ID of a user of a distribution service that is a source of purchase of the distribution content data. Consequently, when the content data is later circulated in the content sharing system 100, the content providing sources of the content data can be specified on a suitable level.

It is to be noted that the addition of a source ID is not restricted to those described above, but the source ID addition section 140 may add, for example, a source ID or IDs of the paragraph (2) or (3) above to production content. If a source ID of the paragraph (2) is added, the providing source of production content data can be identified particularly in a measurement of an application for content production in the content processing apparatus 10. Further, if a source ID of the paragraph (3) is added, the providing source of production content data can be set to the user of the content processing apparatus 10 on which the content data is produced. Or, the source ID addition section 140 may add a source ID of the paragraph (1) or (3), for example, to distribution content.

Further, the source ID addition section 140 can add source IDs of a plurality of measurements to one content data. This makes it possible to specify a providing source of content data on various levels. For example, where source IDs of the paragraphs (1) and (4) type above are added to distribution content data, the user of the providing source of the content data and the content processing apparatus 10 from which the content data is distributed by the user can be specified.

Now timing of the addition of a source ID by the source ID addition section 140 is described. When a source ID is to be added to production content data, the source ID addition section 140 adds, for example, the source ID at a point of time after production of the content by the content production section 130 is completed. On the other hand, when a source ID is to be added to distribution content data, the source ID addition section 140 adds a source ID, for example, at a point of time after reception of the distribution content data by the distribution service utilization section 120 is completed. Furthermore, after a source ID is added by the source ID addition section 140 in this manner, the content recording section 150 records the content data. If a source ID is added immediately to content data in this manner, the source ID can be embedded with certainty into content data that requires copyright management before the content data is circulated in the system.

It is to be noted that the timing of an addition of a source ID is not limited to the examples described above, but may be, for example, a timing at which the content data is rendered for the first time, another timing at which the content data is copied, a further timing at which the content data is provided to another content processing apparatus 10, or the like.

Now a method of addition of a source ID by the source ID addition section 140 is described. The source ID addition section 140 can use, for example, an encryption technique to produce a content file of content data to which a source ID is added. This content file includes, for example, content data encrypted with a content cryptographic key, the content cryptographic key encrypted with a system common key that can be handled only by the content sharing system 100; a source ID; and a falsification preventing signature for linking between the encrypted content cryptographic key and the source ID. Where such a content file as just described is produced, the source ID addition section 140 can embed the source ID safely into the content. Therefore, even if the content data having the source ID added thereto is shared in the content sharing system 100, the source ID added to the content data can be suitably prevented from being falsified.

Meanwhile, as another method of addition of a source ID, the source ID addition section 140 can utilize, for example, an electronic watermark (Digital Watermark) technique to add a source ID to content data. In particular, the source ID addition section 140 may provide distortion to image data or sound data as content data, such that the source ID can be extracted from the content data only by means of an electronic watermark detector. Thus, even if the content data is transferred as analog data between a plurality of content processing apparatuses 10, the source ID can be maintained in the content data. Therefore, the copyright management of content can be executed with a higher degree of severity.

The source ID addition section 140 provided in the content processing apparatus 10 is configured in such a manner as described above. It is to be noted that, in the present embodiment, all of the content processing apparatuses 10 include the source ID addition section 140 so that a source ID is added to content data in every content processing apparatus 10. However, execution of the addition of a source ID to content data is not limited to the examples described above, but, for example, a server apparatus such as a home network server may be provided in a private network in which a plurality of content processing apparatuses 10 are connected such that the server apparatus representatively executes a source ID adding process for all of the content processing apparatuses 10 in the private network.

5. CONTENT RENDERING SECTION

Now the content rendering section 180 in one embodiment is described in detail with reference to FIG. 6.

Figure 6:
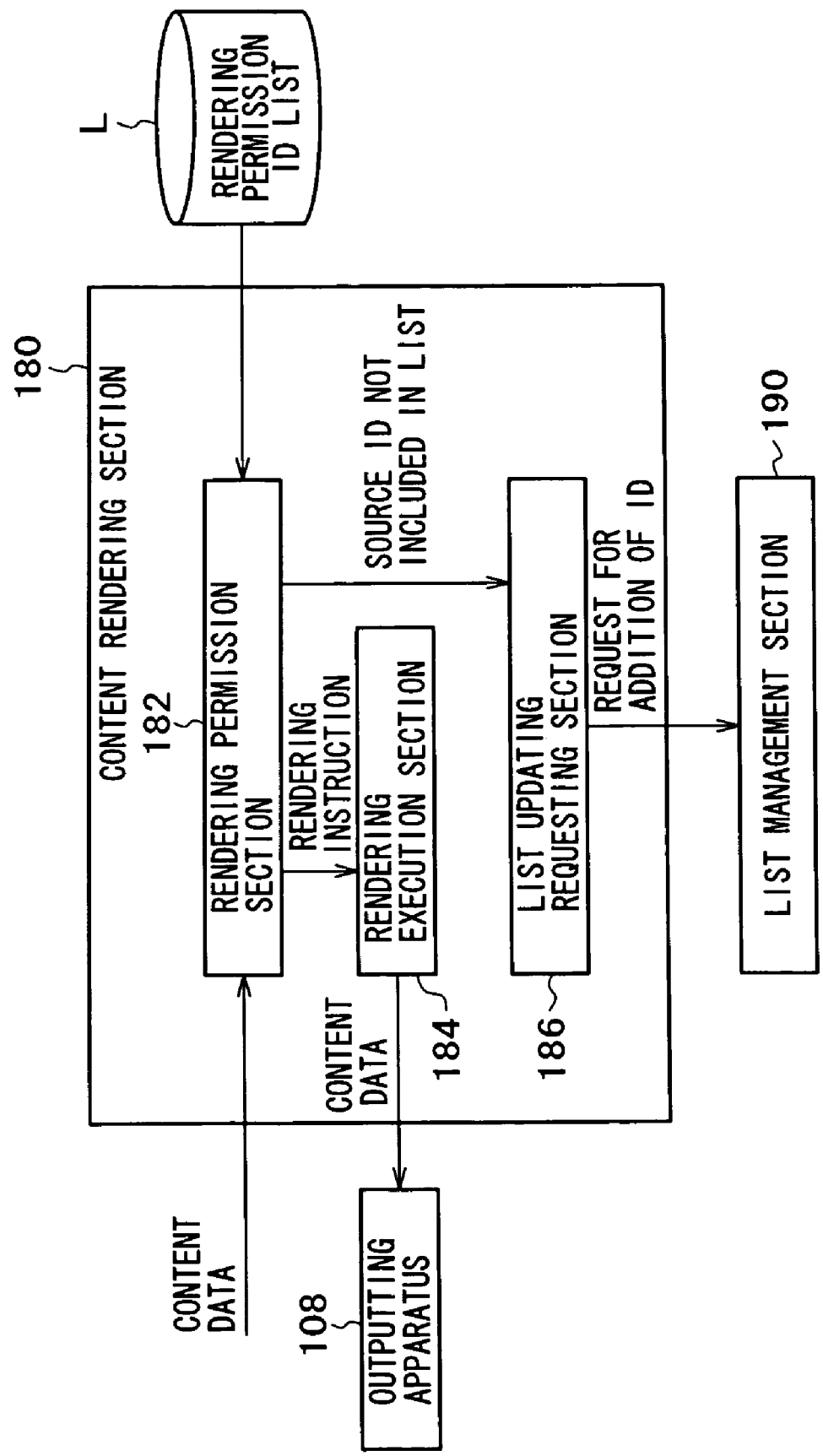
FIG. 6 is a block diagram schematically showing a configuration of a content rendering section shown in FIG. 4.

As seen from FIG. 6, the content rendering section 180 shown includes a rendering permission section 182, a rendering execution section 184, and a list updating requesting section 186.

The rendering permission section 182 permits/limits rendering of content data, to which a source ID is added, based on the rendering permission ID list L.

More particularly, when content data read out, for example, from the storage apparatus 114 or the recording medium 7 is input to the rendering permission section 182, the rendering permission section 182 determines whether or not a source ID is added to the content data. If no source ID is added to the content data, then the rendering permission section 182 determines that no copyright management is required for the content data, permits rendering of the content data, and outputs to the rendering execution section 184 a rendering instruction signal for the content data rendering. On the other hand, if a source ID is added to the content data, then the rendering permission section 182 determines that the content data requires copyright management and performs the following processing.

First, the rendering permission section 182 extracts a source ID from the content data input thereto, and it reads out and interprets the rendering permission ID list L, for example, from the storage apparatus 114. Then, the rendering permission section 182 compares the source ID extracted from the content data and the source IDs included in the rendering permission ID list L. If a result of the comparison indicates that the source ID extracted from the content data is included in the rendering permission ID list L, then the rendering permission section 182 permits rendering of the content data and outputs to the rendering execution section 184 a rendering instruction signal for the content data rendering. On the other hand, if the source ID extracted from the content data is not included in the rendering permission ID list L, then the rendering permission section 182 does not permit rendering of the content data and does not output a rendering instruction signal. Consequently, the rendering execution section 184 cannot render the content data.

In this manner, the rendering permission section 182 in the present embodiment performs such rendering limitation that rendering is inhibited completely for content data to which a source ID that is not included in the rendering permission ID list L is added. However, the rendering limitation of content data is not limited to the example just described, but may be used otherwise as follows. For example, the rendering permission section 182 permits rendering of the content data while restricting the rendering only to part of the content data in time or in substance; or that the rendering execution section 184 permits rendering while the picture quality, sound quality, and so forth are degraded; or else that the rendering permission section 182 permits rendering only for a first predetermined number of times (for example, only once) but inhibits later rendering.

Further, for example, if the source ID extracted from the content data, as described above, is not included in the rendering permission ID list L, the rendering permission section 182 outputs the source ID to the list updating requesting section 186.

The rendering execution section 184 renders content data in accordance with an instruction from the rendering permission section 182, as described above. The rendering execution section 184 is formed from, for example, a rendering apparatus having a content rendering function or software for content rendering.

The list updating requesting section 186 performs a process of issuing a request to update the rendering permission ID list L to the list management section 190. The updating requesting process can be executed, for example, by the list updating requesting section 186 outputting to the list management section 190 an ID addition requesting signal, an ID deletion requesting signal, or an ID change requesting signal representative of a source ID to be added to, deleted from, or changed in the rendering permission ID list L.

More particularly, for example, if a source ID that is not included in the rendering permission ID list L is input from the rendering permission section 182, then the list updating requesting section 186 issues to the list management section 190 a request to add the source ID to the rendering permission ID list L. The list updating requesting section 186 may perform the addition requesting process automatically or after a user's confirmation is obtained regarding whether or not the user wants to add the source ID.

Further, the list updating requesting section 186 may automatically issue to the list management section 190 a request to add a source ID to the rendering permission ID list L. Such a source ID may be a source ID corresponding to: the content processing apparatus 10 in which the list updating requesting section 186 is provided, an application for content production included in the content processing apparatus 10, the user of the content processing apparatus 10, a user account of a content distribution service utilized by the content processing apparatus 10, or the like. If the request is accepted, then the content processing apparatus 10 is enabled to render content data to which is added the source ID of the content processing apparatus 10 itself or the like. Further, the list updating requesting section 186 may issue a request, for example, indicated by an input of the user, to add, delete, or change a source ID to, from, or in the rendering permission ID list L.

In this manner, the content rendering section 180 can render content data to which is added a proper source ID, and it can limit rendering of content data to which is added an improper source ID having no permission for rendering.

6. LIST MANAGEMENT SECTION

Now the list management section 190 in the present embodiment is described in detail with reference to FIG. 7.

As seen in FIG. 7, the list management section 190 includes a list updating permission section 192, an ID collection section 194, a list synchronization section 196, an ID deletion instruction section 198, and a list updating execution section 199.

The list updating permission section 192 executes a process of permitting/rejecting, with reference to a predetermined updating criterion, updating of the rendering permission ID list L. More particularly, for example, if a request is received from the list updating requesting section 186 of the content rendering section 180 for addition of a source ID rendering, then the list updating permission section 192 performs with reference to a predetermined ID addition criterion a process of permitting/rejecting addition of a new source ID to the rendering permission ID list L.

For example, the following criteria 1 to 4 may be used as examples of the ID addition criterion of the list updating permission section 192.

(Criterion 1) The Number of Source IDs to be Included in the Rendering Permission ID List L The criterion 1 provides an upper limit to the number of source IDs to be included in the rendering permission ID list L. In particular, an upper limit number (for example, 1, 3, 20, or the like) to the number of source IDs in the rendering permission ID list L is set in advance, and if the number of source IDs included already in the rendering permission ID list L is smaller than the upper limit number, then addition of a new source ID is permitted, but if the upper limit number is reached, then addition of a new source ID is rejected. According to the criterion 1, an attempt for the same content processing apparatus 10 to acquire and render content data from a plurality of content providing sources exceeding the upper limit number can be inhibited to prevent illegal utilization of the content.

(Criterion 2) The Type of a Source ID to be Added

The criterion 2 defines permission/rejection of addition of a source ID depending upon the type of the source ID to be added, that is, depending upon the type of the content providing source. Since the genre code of the source ID includes a "content production source type code", "company-service type code", "type code of a content providing source", and so forth, as described above, the type of the source ID can be identified, depending upon the source ID. Consequently, the list updating permission section 192 can identify the type of a source ID of an object of a request for addition. Therefore, the list updating permission section 192 can limit addition of a source ID, for example, such that it permits the addition if the source ID is added in a measurement of a content processing apparatus 10, that it rejects the addition if the source ID is added in a measurement of a user account of a distribution source, or that it permits the addition if the source ID relates to a content distribution service α of the A company.

(Criterion 3) The Connection Form Between the Content Rendering Section 180 of the Source of the Request for Addition and the List Management Section 190

The criterion 3 defines permission/rejection of addition of a source ID depending upon the distance, the route of the request, or the like, between the content rendering section 180 of the source of the request for addition and the list management section 190 that permits such addition. The addition is permitted if the connection form between them is, for example, (1) that they are in a locally connected state (accommodated within the same content processing apparatus 10), (2) that they are two content processing apparatuses 10 connected to a private network such as a home network, and (3) that they are a management server (details are described below) and a content processing apparatus 10 connected to a non-private network such as the Internet.

(Criterion 4) Illegal ID List

An illegal ID list is a list of source IDs added to content data whose rendering is inhibited such as, for example, any source ID corresponding to an illegal user who has conducted illegal utilization of content data, such as illegal copying, distribution by a great amount, and so forth, of the content data; or any source ID corresponding to a content processing apparatus 10 owned by an illegal user. The criterion 4 rejects addition of a source ID of an object of a request for addition if the source ID is one of the source IDs included in the illegal ID list. Consequently, since rendering of content data distributed by a great amount by an illegal user can be restricted and invalidated, such illegal action can be prevented.

The list updating permission section 192 may include only one of such criteria 1 to 4 as the ID addition criterion, or it may include two or more of the criteria 1 to 4 in combination as the ID addition criterion.

For example, if the criterion 2 and the criterion 3 are combined, then the list updating permission section 192 can permit addition of a source ID of an object of a request for addition if it is determined that the source ID of the object of the request for addition is a source ID added in a measurement of a user account of a distribution service (criterion 2) and that the request for addition relates to a local connection (criterion 3).

On the other hand, if the criteria 1 to 4 are combined, then the list updating permission section 192 can permit addition of a source ID if it determines that the number of source IDs included in the rendering permission ID list L is less than 30 (criterion 1), that the source ID is one of source IDs for self recording or ripping (criterion 2), that the request for addition is originated from a content processing apparatus 10 connected in the home network (criterion 3), and that the source ID is not included in the illegal source ID list (criterion 4).

As described above, the list updating permission section 192 can, in response to a request for addition of an ID from the outside, with reference to the ID updating criterion described above, permit/reject addition of a source ID to the rendering permission ID list L. If the list updating permission section 192 permits the addition, then it issues to the list updating execution section 199, which performs a rewriting process on the rendering permission ID list L, an instruction to add the permitted source ID to the rendering permission ID list L rendering.

Further, if a notification of a source ID corresponding to a user account of a content distribution service is received from the distribution server 20 described below, then the list updating permission section 192 permits, unconditionally for example, addition of the notification's source ID, and it issues to the list updating execution section 199 an instruction for addition. Consequently, the content rendering section 180 of the content processing apparatus 10 can render the distribution content data from the content distribution service.

The ID collection section 194 can collect source IDs from the other one or more content processing apparatuses 10 connected to the private network, such as, for example, a home network. The source IDs collected in this manner, for example, correspond to the content processing apparatuses 10 connected to the private network. Further, the ID collection section 194 can acquire the source ID possessed by the source ID addition section 140 provided in the content processing apparatus 10 itself.

Furthermore, the ID collection section 194 produces a new rendering permission ID list including the plural source IDs collected in such a manner as described above, and it distributes the new rendering permission ID list to the other content processing apparatuses 10. Further, the ID collection section 194 outputs to the list updating permission section 192 the collected plural source IDs, and it issues to the list updating permission section 192 a request to add the source IDs to the rendering permission ID list L. Consequently, the plural content processing apparatuses 10 connected to the private network can share the source IDs they possess. Therefore, the plural content processing apparatuses 10 can share content data and render the content data with each other.

The list synchronization section 196 has a function of synchronizing the rendering permission ID lists L. The synchronization of the rendering permission ID lists L here signifies merging of the plural rendering permission ID lists L, and the rendering permission ID lists L after synchronizing include all of the source IDs that have been included in the plural original rendering permission ID lists L.

For example, the list synchronization section 196 can synchronize the rendering permission ID list L provided in the content processing apparatus 10 in which the list synchronization section 196 itself is provided, with the rendering permission ID list L or rendering permission ID lists L provided in the other content processing apparatuses 10 connected to the private network, or with the rendering permission ID list L recorded on the recording medium 7. The list synchronization section 196 issues an instruction to the list updating execution section 199 to update the rendering permission ID list L after the synchronization.

By the synchronization process described, the rendering permission ID lists L provided in the plural content processing apparatuses 10 can be made the same as each other. Therefore, the plural content processing apparatuses 10 can share and mutually render the content data. It is to be noted that, as a permission criterion for the synchronization process by the list synchronization section 196, criteria similar to the ID addition criteria 1 to 4 described above can be adopted. Further, the synchronization process may be performed automatically, for example, between the content processing apparatuses 10 in the private network, or the process may be performed for a particular one of the content processing apparatuses 10 or for the recording medium 7 as designated by an instruction of the user.

The ID deletion instruction section 198 can, based on a predetermined ID deletion criterion, issue, for example, to the list updating execution section 199 an instruction to delete a source ID included in the rendering permission ID list L. The ID deletion instruction is executed by the list updating execution section 199, for example, in response to an ID deletion instruction signal to the list updating execution section 199.

For example, the ID deletion instruction section 198 can acquire an illegal source ID list, as described above, from the outside and issue an instruction to delete source IDs included in the illegal source ID list from the rendering permission ID list L. Consequently, any illegal source ID can be forced to be deleted so as to inhibit illegal utilization of content data. Further, the ID deletion instruction section 198 can check the source IDs in the rendering permission ID list L periodically, for example. If a source ID that has not been utilized for rendering of content data by a predetermined number of times or for a predetermined period of time is detected, the ID deletion instruction section 198 can issue an instruction to delete the source ID. Consequently, any unnecessary source ID can be deleted automatically.

The list updating execution section 199 executes an updating process of the rendering permission ID list L in accordance with an instruction from any of the pertaining sections described above. For example, the list updating execution section 199 can write a new source ID additionally into the rendering permission ID list L in response to an ID addition instruction from the list synchronization section 196. Further, the list updating execution section 199 can rewrite the rendering permission ID list L to a synchronized state in accordance with a list updating instruction from the list synchronization section 196. It is to be noted that the list updating execution section 199 can interpret the rendering permission ID list L, which is, for example, in an encrypted state for prevention of falsification, or it can rewrite the rendering permission ID list L without altering a signature added to the rendering permission ID list L.

The list management section 190 in the present embodiment is such as described above. The list management section 190 can add/delete a source ID to/from the rendering permission ID list L in this manner to permit/reject rendering of content data in a measurement of a source ID, that is, in a measurement of a content providing source. By invalidating content data in this manner, illegal copying or illegal utilization of the content data can be prevented.

It is to be noted that, in the present embodiment, for example, the list management section 190 is provided in all of the content processing apparatuses 10, and the rendering permission ID list L provided in each of the content processing apparatuses 10 can be updated by the respective list management sections 190. However, the provision of the list management section 190 is not limited to this, but, for example, a single list management section 190 may be provided for a plurality of content processing apparatuses 10 in a private network such that it manages the rendering permission ID lists L of all of the content processing apparatuses 10 in a concentrated manner. In this instance, the list management section 190 is preferably provided, for example, in a server apparatus connected to the private network.

Now a particular example of the rendering permission ID list L in the present embodiment is described with reference to FIGS. 8A and 8B. FIG. 8A illustrates an example of a configuration of the rendering permission ID list L in the present embodiment, and FIG. 8B illustrates an example of a data structure of the rendering permission ID list L in the present embodiment.

The rendering permission ID list L includes, for example, one or more source IDs 402 as seen in FIG. 8A. Further, the rendering permission ID list L includes source ID reference information including, for example, information 404 regarding the content rendering section 2 of a source of a request for addition of a source ID, information 406 regarding the list management section 3 that has permitted addition of a source ID, date and hour information 408 of the date and hour at which the addition of the source ID is permitted, and so forth. Such source ID reference information can be used to manage the history of each source ID included in the rendering permission ID list L.

Further, the rendering permission ID list L actually includes, for example, text data as seen in FIG. 8B. The text data includes, for example, a list body data part 410 and a signature data part 414. The list body data part 410 includes a list substance data part 412 representative of actual data of the source ID and source ID reference information, described above. The list body data part 410 further includes signature information for detecting the presence or absence of falsification of the signature data part 414, or of the list body data part 410, or of MAC information.

7. DISTRIBUTION SERVER

Now the distribution server 20 in the present embodiment is described in detail with reference to a block diagram of FIG. 9.

The distribution server 20 includes a CPU 202, a memory 204, a communication apparatus 210, a storage apparatus 214, a distribution service execution section 220, a source ID addition section 240, a source ID notification section 250, and a list management section 290. It is to be noted that the CPU 202, memory 204, and communication apparatus 210 have a substantially same functional configuration as the CPU 102, memory 104, and communication apparatus 110 of the content processing apparatus 10 described above, respectively, and therefore detailed description of them is omitted herein to avoid redundancy.

The storage apparatus 214 is an apparatus for storing data and is formed from, for example, a hard disk driver, and it can store various data of programs and so forth. Further, the storage apparatus 214 has, for example, a content database 216, a user information database 218, and an accounting information database 219 stored therein. The content database 216 is a database of a plurality of content data that are objects of distribution in a content distribution service. The user information database 218 includes, for example, personal information of users who enjoy provision of a distribution service, user account IDs, authentication information such as passwords, various kinds of user information such as accounting information, and so forth. The accounting information database 219 includes accounting information for the individual users.

The distribution service execution section 220 performs a content distribution service of distributing content data to a user of a plurality of content processing apparatuses 10 who is a client, for example, for pay. The distribution service execution section 220 includes a user registration section 222, a user authentication section 224, a content distribution section 226, and an accounting processing section 228.

The user registration section 222 performs a registration process for a new user, management of user information, and so forth. For a registered user, a unique user account ID is set in a measurement of a user and a notification of this is issued. Various kinds of information input and determined with a registration process by the user registration section 222 are stored into the user information database 218.

The user authentication section 224 performs a user authentication process in response to a request for connection, for example, from a registered user. The user authentication process is performed, for example, based on a user account ID and a password or the like input by the user, and on user information from the user information database 218. The authenticated user is permitted to log in to the content distribution section 226.

The content distribution section 226 allows, for example, a user having been authenticated to access a list of content data that can be distributed, and to select the content data that the user wants to be distributed. Further, the content distribution section 226 distributes, via network 5, the selected content data to the content processing apparatus 10 that is utilized by the user. It is to be noted that the distribution of content data is performed, for example, with an accounting process, described below.

The accounting processing section 228 performs an accounting process for issuing a claim for payment of an amount of money corresponding to distributed content data, for example, to a user to which the content data is distributed. Accounting information such as the amount of money claimed, a settlement method, and a settlement date involved in the accounting process is stored, for example, into the accounting information database 219.

The source ID addition section 240 is a component corresponding to the source ID addition section 1 described above with reference to FIG. 1. The source ID addition section 240 has a functional configuration substantially the same as that of the source ID addition section 140 provided in the content processing apparatus 10. The source ID addition section 240 adds, for example, to content data to be distributed by the content distribution section 226, a source ID corresponding to the content processing apparatus 10 of the destination of the distribution, a user account, or the like. If a source ID is added to content data in advance by the distribution server 20 side, and the content data having the source ID added thereto is distributed, the source ID can be added with certainty to the distribution content data, and the copyright managing function can be strengthened. It is to be noted that, if all of the content processing apparatuses 10 include the source ID addition section 140, the source ID addition section 240 may not necessarily be provided.

The source ID notification section 250 can notify, for example, one or more content processing apparatuses 10 owned by the same user of a source ID corresponding to a user account of the user.

The list management section 290 is a component corresponding to the list management section 3 described above with reference to FIG. 1, and it performs an updating process of the rendering permission ID list L possessed by each of the content processing apparatuses 10. The list management section 290 includes a list updating permission section 292 for permitting/rejecting updating of the rendering permission ID list L such as, for example, addition of a new source ID to the rendering permission ID list L. The list updating permission section 292 can permit/reject, in response to a request for addition of a new source ID, for example, from a content processing apparatus 10 of the destination of the distribution of contents, the addition of the source ID corresponding to a user account of a distribution service to the rendering permission ID list L possessed by the content processing apparatus 10. When the addition of the source ID is to be permitted, the list updating permission section 292 transmits an addition permission signal to the list updating execution section 199 of the list management section 190 of the content processing apparatus 10. As a result, the list updating execution section 199 performs a process of adding the source ID to the rendering permission ID list L of the content processing apparatus 10. On the contrary, if the addition of the source ID is to be rejected, the list updating permission section 292 transmits an addition rejection signal to the content processing apparatus 10 of the source of the request for addition.

Such a permission process for addition of a source ID by the list updating permission section 292 as described above is performed in accordance with a predetermined ID addition criterion. As an example of the ID addition criterion of the list updating permission section 292, for example, the following criteria 5 and 6 may be used in addition to the criteria 1 to 4 described above.

(Criterion 5) A Result of Authentication of the Content Processing Apparatus 10 of a Source of Request for Addition or the User of the Content Processing Apparatus 10

The criterion 5 provides permission for addition of a source ID corresponding to a user account of a distribution service if the content processing apparatus 10 that has issued a request for addition, or the user of the content processing apparatus 10, is authenticated by the user authentication section 224 of the distribution server 20.

Where the criterion 5 is adopted, a source ID corresponding to a user account of a distribution service can be added to the rendering permission ID list L of each of a plurality of content processing apparatuses 10 utilized by the user of the distribution service. This makes it possible for distribution content data purchased by the user to be rendered by the plural content processing apparatuses 10 owned by the same user without the necessity for downloading the same distribution content data again.

(Criterion 6) Presence or Absence of an Accounting Process for a Request for Updating The criterion 6 provides permission for addition of a source ID corresponding to a user account of a distribution service if an accounting process for the request for addition of a source ID is completed by the accounting processing section 228 of the distribution server 20.

Where the criterion 6 is adopted, for example, if after a user of a distribution service uses a certain content processing apparatus 10 to download distribution content the accounting process permits payment of an additional charge for a source ID (lower charge than the download charge), then the accounting process can itself add the source ID corresponding to the user account of the distribution service to the rendering permission ID list L of another content processing apparatus 10 owned by the user. Consequently, by paying the lower charge, the user can render distribution content data purchased by the user on a plurality of content processing apparatus 10 owned by the same user without downloading the same distribution content data again. Further, the manager of the content distribution service can enjoy increased gains by only applying a comparatively easy modification to the distribution server 20.

The list updating permission section 292 may use only one of the criteria 1 to 6 described above as the ID addition criterion, or it may alternatively use two or more of the criteria 1 to 6 in combination as the ID addition criterion.

For example, where the criteria 2, 3, 5, and 6 are used in combination, the list updating permission section 292 can permit addition of a source ID if it determines that the source ID of an object of the request for addition relates to a content distribution service α of the A company (criterion 2), that the request for addition originates from an authenticated client to the server (criteria 3 and 5), and that accounting information for the additional source ID is registered already in the accounting information database 219 of the distribution server 20 (criterion 6).

The processing of the list management section 290 is such as described above. It is to be noted that, where all of the content processing apparatuses 10 include the list management section 190, the distribution server 20 may not include the list management section 290.

8. CONTENT SHARING METHOD

Figure 10:
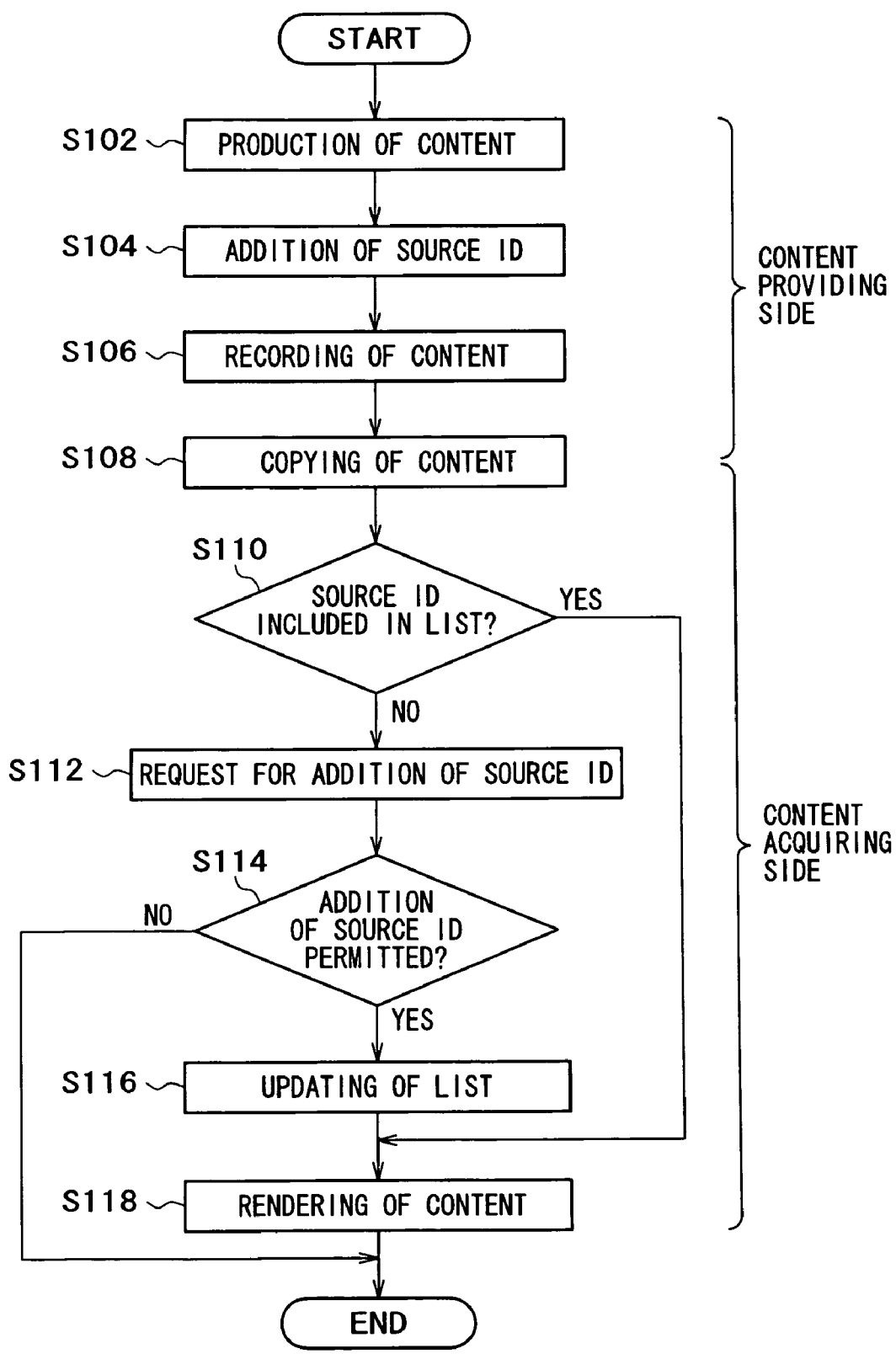
FIG. 10 is a flow chart illustrating a basic flow of a content sharing method in accordance with the first embodiment of the present invention.

Now a basic flow of a content sharing method that utilizes such a content sharing system 100 as described above is described with reference to a flow chart of FIG. 10. It is to be noted that the content sharing method described below relates to an example wherein, between the two content processing apparatuses 10-1 and 10-2, content data produced by the content processing apparatus 10-1 on the content providing side is shared by the content processing apparatus 10-2 on the content acquiring side.

First, at step S102, the content processing apparatus 10-1 of the content providing side produces content data. In particular, the content production section 130 of the content processing apparatus 10-1 produces new content data by self recording, ripping, or the like.

Then, at step S104, the content processing apparatus 10-1 adds a source ID to the production content data. In particular, the source ID addition section 140 of the content processing apparatus 10-1 embeds, for example, the unique source ID "ID1" corresponding to the content processing apparatus 10-1 into the content data produced at step S102.

Further, at step S106, the content processing apparatus 10-1 on the content providing side records the content data having the source ID added thereto. In particular, the content recording section 150 of the content processing apparatus 10-1 records the content data, to which the source ID was added at step S104 described above, as a content file into the storage apparatus 114, or the like. It is to be noted that, since the unique source ID "ID1" of the content processing apparatus 10-1 corresponding to the content processing apparatus 10-1 itself is included in the rendering permission ID list L of the content processing apparatus 10-1, the content processing apparatus 10-1 can render the content data produced by the content processing apparatus 10-1 and having the source ID "ID1" added thereto.

Thereafter, at step S108, the content data having the source ID added thereto is copied from the content processing apparatus 10-1 on the content providing side to the content processing apparatus 10-2 on the content acquiring side. Both of the content processing apparatuses 10-1 and 10-2 utilize, for example, file exchange software to copy via network 5 the content data having the source ID added thereto. The copied content data is recorded into the storage apparatus 114 or the like of the content processing apparatus 10-2 on the content acquiring side.

Then, at step S110, the content processing apparatus 10-2 determines whether or not the source ID added to the copied content data is included in the rendering permission ID list L of the content processing apparatus 10-2 of the content acquiring side. In order for the content rendering section 180 of the content processing apparatus 10-2 to render the copied content data, the rendering permission section 182 first determines whether or not the source ID "ID1" added to the content data is included in the rendering permission ID list L. If the source ID "ID1" is included in the rendering permission ID list L, then the rendering permission section 182 permits the rendering of the content data, whereafter the processing advances to step S118. On the other hand, if the source ID "ID1" is not included in the rendering permission ID list L, then the rendering permission section 182 does not permit the rendering of the content data, and the processing advances to step S112.

At step S112, the content rendering section 180 of the content processing apparatus 10-2 issues to the list management section 190 a request for addition of the source ID to the rendering permission ID list L. In order to allow the content data having the source ID "ID1" added thereto to be rendered, the list updating requesting section 186 of the content rendering section 180 issues to the list updating permission section 192 in the list management section 190 a request to add the source ID "ID1" to the rendering permission ID list L.

Then, at step S114, the list management section 190 of the content processing apparatus 10-2 permits/rejects the addition of the source ID of an object of the request for addition. The list updating permission section 192 in the list management section 190 determines, based on such an ID addition criterion, as described above, whether or not the source ID "ID1" of the object of the request for addition should be added to the rendering permission ID list L. Then, if the addition is permitted, the processing advances to step S116, but if the addition is not permitted, then all of the steps are ended and the content data having the source ID "ID1" added thereto is left disabled for rendering.

At step S116, the rendering permission ID list L of the content processing apparatus 10-2 on the content acquiring side is updated (step S116). In particular, the list updating permission section 192 of the list management section 190 uses the list updating execution section 199 to add the source ID "ID1" of the object of the request for addition to the rendering permission ID list L. As a result, the content processing apparatus 10-2 is permitted to render the content data having the source ID "ID" added thereto.

Further, at step S118, the content processing apparatus 10-2 of the content acquiring side renders the content data copied from the content processing apparatus 10-1 of the content providing side. Since the rendering permission section 182 of the content rendering section 180 permits rendering of the content data, the rendering execution section 184 renders the content data.

All of the basic flow of the content sharing method in accordance with the present embodiment is completed with the steps described above.

Figure 11:
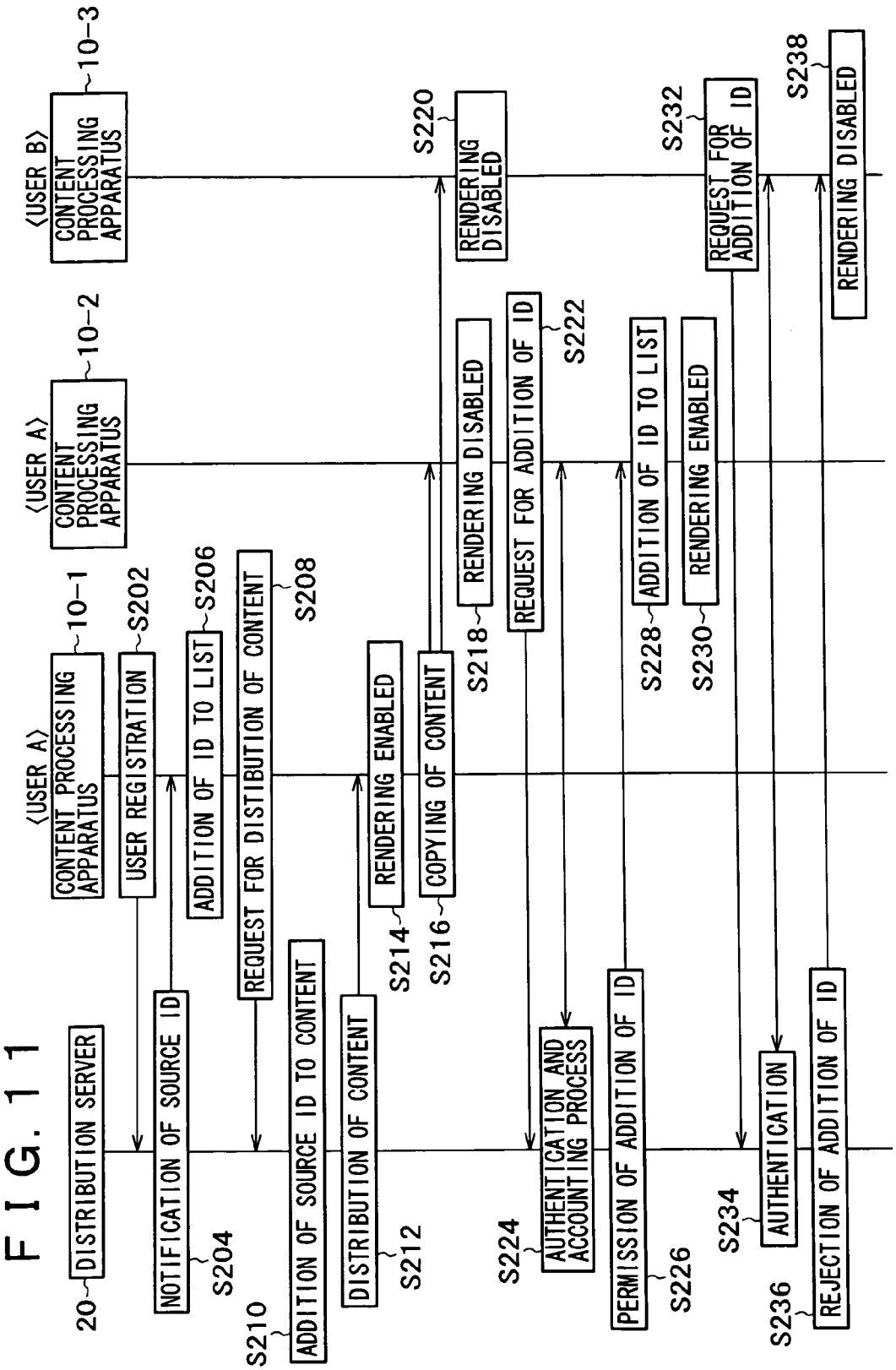
FIG. 11 is a timing chart illustrating another flow of the content sharing method in accordance with the first embodiment of the present invention.

Now another flow of the content sharing method which utilizes the content sharing system 100 described above is described with reference to a timing chart of FIG. 11. It is to be noted that the content sharing method described below relates to an example wherein the two content processing apparatuses 10-1 and 10-2 owned by a user A can share content data distributed from the distribution server 20, whereas the content processing apparatus 10-3 owned by another user B cannot share the content data.

First, at step S202, user A would use the content processing apparatus 10-1 to access the distribution server 20 and perform user registration into a content distribution service. As a result, user A can acquire a user account in the distribution service and can enjoy the distribution service of downloading content data.

Then, at step S204, the source ID notification section 250 of the distribution server 20 issues a notification of a source ID "user ID-A" corresponding to the user account of the user A to the content processing apparatus 10-1. The distribution server 20 may perform the notification process of the source ID automatically upon the user registration, or otherwise in response to a notification request from the user.

At step S206, the list updating execution section 199 of the content processing apparatus 10-1 adds the source ID "user ID-A" of the notification to the rendering permission ID list L of the content processing apparatus 10-1.

Then, at step S208, the content processing apparatus 10-1 issues a request to the distribution server 20 to distribute predetermined content data based on an input of the user A.

Then, at step S210, the source ID addition section 240 of the distribution server 20 adds to the content data to be distributed the source ID "user ID-A", corresponding to the user account of the user A for the distribution destination.

Further, at step S212, the content distribution section 226 of the distribution server 20 distributes the content data having the source ID "user ID-A" added thereto to the content processing apparatus 10-1. Consequently, the distribution service utilization section 120 of the content processing apparatus 10-1 receives the distributed content.

As a result, since the source ID "user ID-A" is included in advance in the rendering permission ID list L of the content processing apparatus 10 at step S206, the content rendering section 180 of the content processing apparatus 10-1 is enabled, at step S214 to render the distribution content data having the source ID "user ID-A" added thereto.

It is to be noted that, while, in the example described above, the source ID addition section 240 of the distribution server 20 adds a source ID to content data to be distributed, the addition of a source ID is not limited to the example described, but, for example, the source ID addition section 140 of the content processing apparatus 10-1 may add to the received content data the source ID "user ID-A".

Then, at step S216, the distribution content data having the source ID "user ID-A" added thereto is copied from content processing apparatus 10-1 owned by the user A to the content processing apparatus 10-2 owned by the user A and to content processing apparatus 10-3 owned by the user B. The content processing apparatuses 10-1, 10-2, and 10-3 can copy the distribution content data having the source ID "user ID-A" added thereto, for example, making use of file exchange software or electronic mail. The copied content data is recorded in the storage apparatus 114 or the like of the content processing apparatuses 10-2 and 10-3.

However, the rendering permission ID list L of the content processing apparatus 10-2 and the rendering permission ID list L of the content processing apparatus 10-3 do not include the source ID "user ID-A" corresponding to the user account of the user A. Therefore, the content rendering sections 180 of the content processing apparatuses 10-2 and 10-3 cannot render the content data having the source ID "user ID-A" added thereto (steps S218 and S220).

Then, at step S222, the content rendering section 180 of the content processing apparatus 10-2 issues to the list management section 290 of the distribution server 20 a request for addition of the source ID. It is assumed that, in the example of FIG. 11, the list management sections 190 of the content processing apparatuses 10-1, 10-2, and 10-3, which are clients of the distribution service, do not include the list updating permission section 192 and only the list management section 290 of the distribution server 20 includes the list updating permission section 292. Therefore, since none of the content processing apparatuses 10 can itself perform an updating permission process for the rendering permission ID list L in the content processing apparatus 10, it is necessary to issue a request for updating of the rendering permission ID list L to the distribution server 20 so that an updating permission process may be performed by the distribution server 20.

Therefore, in order for the content rendering section 180 of the content processing apparatus 10-2 to render the content data having the source ID "user ID-A" added thereto, content processing apparatus 10-2 issues to the list management section 290 of the distribution server 20 a request to add the new source ID "user ID-A" to the rendering permission ID list L.

Further, at step S224, the list updating permission section 292 of the distribution server 20 issues a request, for example, to the distribution service execution section 220 of the distribution server 20 to perform an authentication process for the content processing apparatus 10-2, the source of the request for addition, and an accounting process for the addition of the source ID. In this instance, since the request originates from the content processing apparatus 10-2 owned by the user A, who already has a user registration, if the condition that user authentication is performed properly through password inputs and so forth is satisfied, then the content processing apparatus 10-2 is authenticated successfully by the distribution server 20. Further, the accounting processing section 228 performs an accounting process for the addition of the source ID.

Further, at step S226, if the authentication process and the accounting process for the content processing apparatus 10-2 are completed normally at step S224, described above, then the list updating permission section 292 of the distribution server 20 permits the addition of the new source ID "user ID-A" to the rendering permission ID list L of the content processing apparatus 10-2.

Hereafter, at step S228, as permitted for addition by the distribution server 20, the list updating execution section 199 of the list management section 190 of the content processing apparatus 10-2 adds the source ID "user ID-A" to the rendering permission ID list L of the content processing apparatus 10-2. Consequently, the content rendering section 180 of the content processing apparatus 10-2 of the user A is enabled at step S230, to render the distribution content data having the source ID "user ID-A" added thereto.

On the other hand, at step S232, the content rendering section 180 of the content processing apparatus 10-3 of the user B issues to the list updating permission section 292 of the distribution server 20 a request for addition of the source ID.

Then, at step S234, the list updating permission section 292 of the distribution server 20 issues a request, for example, to the distribution service execution section 220 of the distribution server 20 to perform an authentication process of the content processing apparatus 10-3, the source of the request for addition. In this instance, since the users of the source ID "user ID-A" of an object of the request for addition and the content processing apparatus 10-3 are different from each other, the distribution service execution section 220 does not authenticate the content processing apparatus 10-3.

Therefore, at step S236, the list updating permission section 292 of the distribution server 20 rejects the addition of the new source ID "user ID-A" to the rendering permission ID list L of the content processing apparatus 10-3. As a result, the content rendering section 180 of the content processing apparatus 10-3 of the user B still remains disabled at step S238, to render the distribution content data having the source ID "user ID-A".

All of the flow of the content sharing method is completed with the steps described above. In accordance with the flow described, a source ID is added in a measurement of a user account of a distribution service, and also an addition permission process of a source ID, is performed in a measurement of a user. Therefore, for example, if the user is the same, then content data can be rendered comparatively freely using a plurality of content processing apparatuses 10, but if the user is different, then rendering of content data can be limited.

9. APPLICATION EXAMPLES

Now application examples wherein content data are shared by a plurality of content processing apparatuses 10 in such a content sharing system 100 as described above are described.

It is to be noted that in the following description of the application examples, reference characters "ID1", "ID2", . . . denote source IDs unique to the content processing apparatuses 10-1, 10-2, . . . , respectively. Further, reference characters "user ID-A", "user ID-B", . . . denote source IDs unique to users corresponding to user accounts of the users A, B, . . . of a distribution service, respectively. Further, reference characters "L1", "L2, . . . denote rendering permission ID lists L owned by the content rendering sections 180 of the content processing apparatuses 10-1, 10-2, . . . or rendering permission ID lists L recorded on recording media, respectively. Furthermore, reference characters "C1", "C2", . . . denote content data produced by the content production sections 130 of the content processing apparatuses 10-1, 10-2, . . . or content data received by the distribution service utilization sections 120.

Application Example 1

First, an application example 1 of the content sharing system 100 in accordance with the present embodiment is described with reference to FIG. 12.

Figure 12:
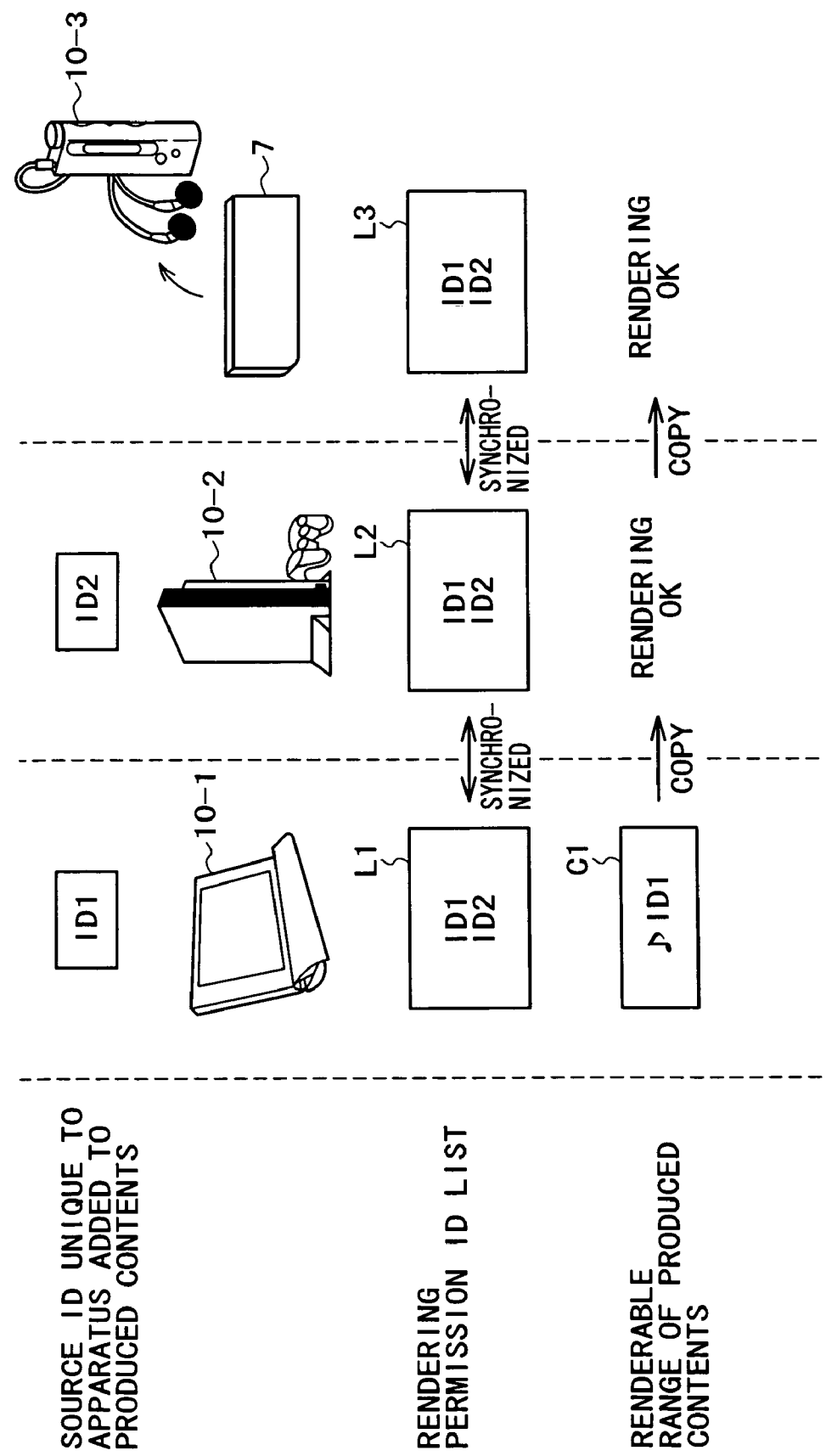
FIGS. 12, 13, 14, 15, and 16 are diagrammatic views illustrating application examples 1, 2, 3, 4, and 5 of the content sharing system in accordance with the first embodiment of the present invention, respectively.

As shown in FIG. 12, in the application example 1, content data C1 produced on the content processing apparatus 10-1 is shared by the two content processing apparatuses 10-1 and 10-2 in a home, and it is carried with a copyright management function outside of the home via a recording medium 7. It is to be noted that each of the content processing apparatuses 10-1 and 10-2 includes the content production section 130, which can perform self-recording and so forth, and can newly produce content data such as sound data.

More particularly, the list synchronization sections 196 of the two content processing apparatuses 10-1 and 10-2 synchronize the rendering permission ID list L1 of the content processing apparatus 10-1 and the rendering permission ID list L2 of the content processing apparatus 10-2 with each other. Consequently, the source IDs ID1 and ID2 are included in each of the rendering permission ID lists L1 and L2.

Then, content data C1 is produced on the content processing apparatus 10-1 and the source ID "ID1" is added to the content data C1. The resulting content data C1 is copied into the content processing apparatus 10-2. Thus, since the source ID ID1 is included in the rendering permission ID list L2, the content processing apparatus 10-2 can render the content data C1. In this manner, the content data C1 can be shared between, and rendered by, both of the content processing apparatuses 10-1 and 10-2 in the home.

Further, if the rendering permission ID list L1 or L2 and the rendering permission ID list L3 recorded on the recording medium 7 with a copyright management function are synchronized with each other, then the source IDs ID1 and ID2 can be included also into the rendering permission ID list L3. Further, the content data C1 is copied into the recording medium 7 with a copyright management function.

Consequently, if the recording medium 7 with a copyright management function is loaded into the content processing apparatus 10-3, which may be a portable sound player, then the content processing apparatus 10-3 can render the content data C1 using the rendering permission ID list L3.

In this manner, in the application example 1, not only content data can be shared by the content processing apparatus 10-1 and 10-2 in the home, but also the content data can be rendered on the portable content processing apparatus 10-3 outside the home using the recording medium 7 with a copyright management function.

Application Example 2

Now an application example 2 of the content sharing system 100 in accordance with the present embodiment is described with reference to FIG. 13.

Figure 13:
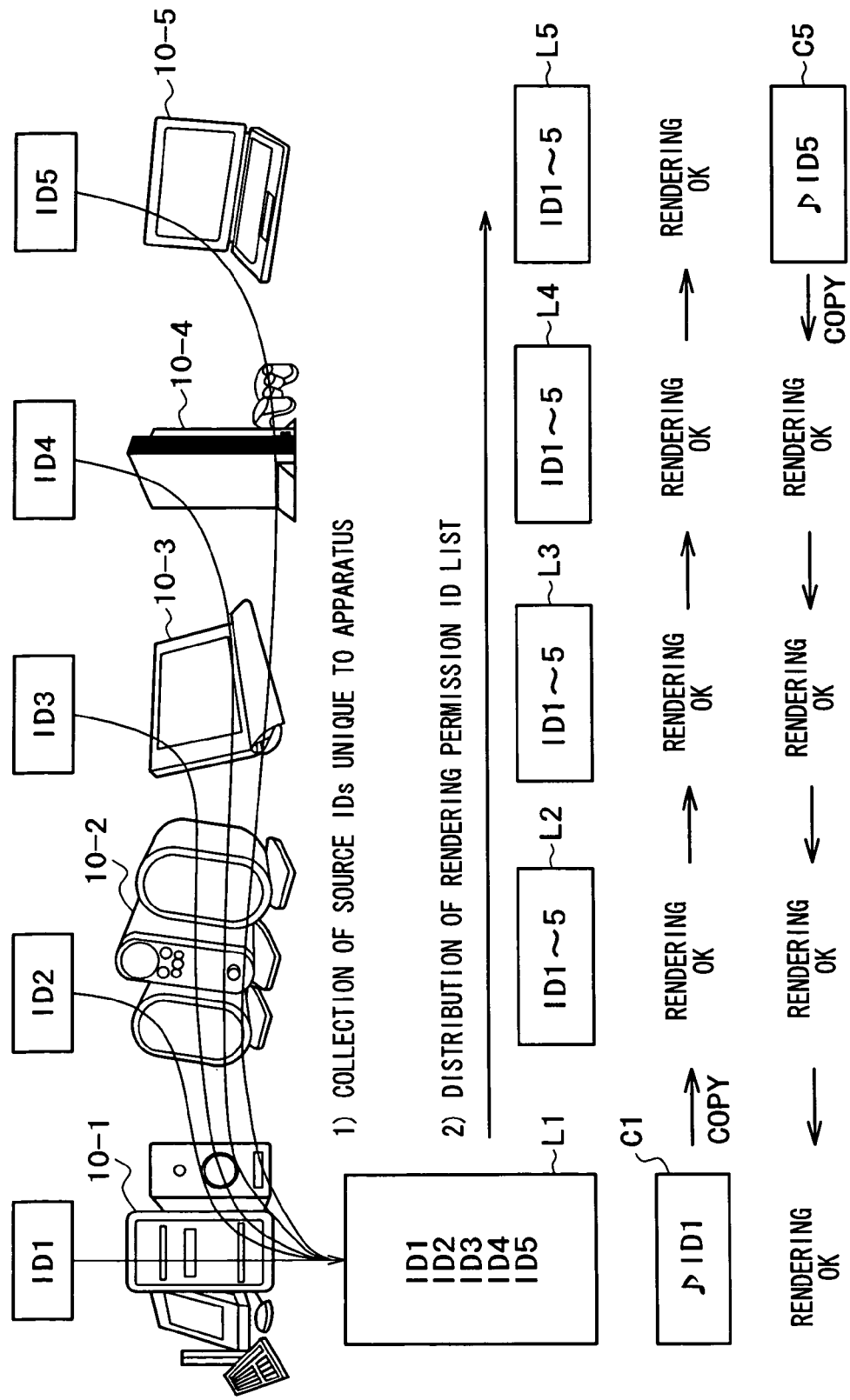

As seen from FIG. 13, in the application example 2, production content data C1 and C5 are shared in a home by the five content processing apparatuses 10-1 to 10-5.

In particular, the ID collection section 194 of the list management section 190 of the content processing apparatus 10-1 is utilized to collect the IDs ID2 to ID5 of the five content processing apparatuses 10-1 to 10-5 through the network and to add the IDs ID2 to ID5 to the rendering permission ID list L1 of the content processing apparatus 10-1. Consequently, all IDs ID1 to ID5 are included in the rendering permission ID list L1.

Then, the ID collection section 194 of the content processing apparatus 10-1 is utilized to distribute via the network to the other content processing apparatuses 10-2 to 10-5 the rendering permission ID list L1 including the IDs ID1 to IDS so as to update the rendering permission ID lists L2 to L5. As a result, the IDs ID1 to IDS are included in the rendering permission ID lists L1 to L5 of all of the content processing apparatuses 10-1 to 10-5.

In this manner, the content processing apparatuses 10-1 to 10-5 in the home can mutually copy and render the production content data C1 to C5 produced on them.

Application Example 3

Now an application example 3 of the content sharing system 100 in accordance with the present embodiment is described with reference to FIG. 14.

Figure 14:
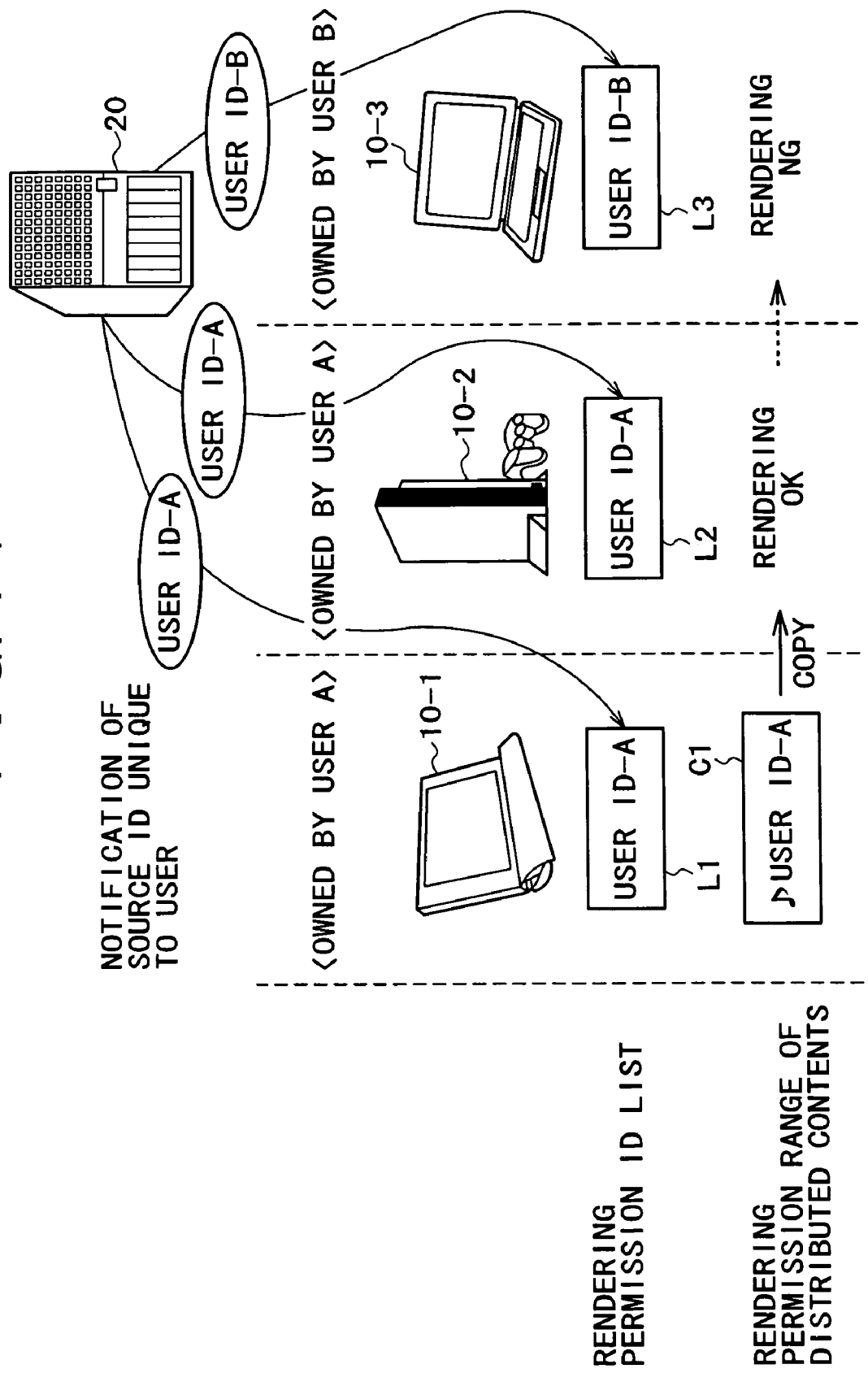

As seen from FIG. 14, in the application example 3, content data C1 distributed from the distribution server 20 is shared by the two content processing apparatuses 10-1 and 10-2 owned by the user A of a content distribution service.

In particular, the user A would first access the distribution server 20 through the content processing apparatus 10-1 or 10-2, owned by the user A, to perform user registration into the content distribution service. Upon such registration, or upon issuance of a request from the content processing apparatus 10-1 or 10-2 for notification of a source ID, the distribution server 20 notifies the content processing apparatus 10-1 or 10-2 of the source ID "user ID-A". In response to the notification, the content processing apparatus 10-1 or 10-2 adds the source ID "user ID-A" to the rendering permission ID list L1 or L2 thereof.

Similarly, the content processing apparatus 10-3 owned by the user B adds the source ID "user ID-B" to the rendering permission ID list L3.

Further, if the user A uses the content processing apparatus 10-1 to issue a request for distribution of content, then the content data C1 is distributed from the distribution server 20 to the content processing apparatus 10-1. The content data C1 has the source ID "user ID-A" added thereto, for example, by the source ID addition section 240 of the distribution server 20.

Then, the content data C1 having the source ID "user ID-A" added thereto is copied into the content processing apparatus 10-2. Since the source ID "user ID-A" is included in the rendering permission ID list L2 of the content processing apparatus 10-2, the content processing apparatus 10-2 can render the content data C1 copied from the content processing apparatus 10-1. In this manner, the content data C1 can be shared between the content processing apparatuses 10-1 and 10-2 owned by the user A.

On the other hand, since the rendering permission ID list L3 of the content processing apparatus 10-3 owned by the user B does not include the source ID "user ID-A", and since the user of the content processing apparatus 10-3 is different, even if the content processing apparatus 10-3 issues a request for permission of addition of the source ID "user ID-A", the addition is not permitted at all. Therefore, even if the content data C1 is copied from the content processing apparatus 10-1 into the content processing apparatus 10-3, it cannot be rendered by the content processing apparatus 10-3.

In this manner, the application example 3 acknowledges sharing of distribution content data only between the different content processing apparatuses 10 owned by the same user.

Application Example 4

Now an application example 4 of the content sharing system 100 in accordance with the present embodiment is described with reference to FIG. 15.

Figure 15:
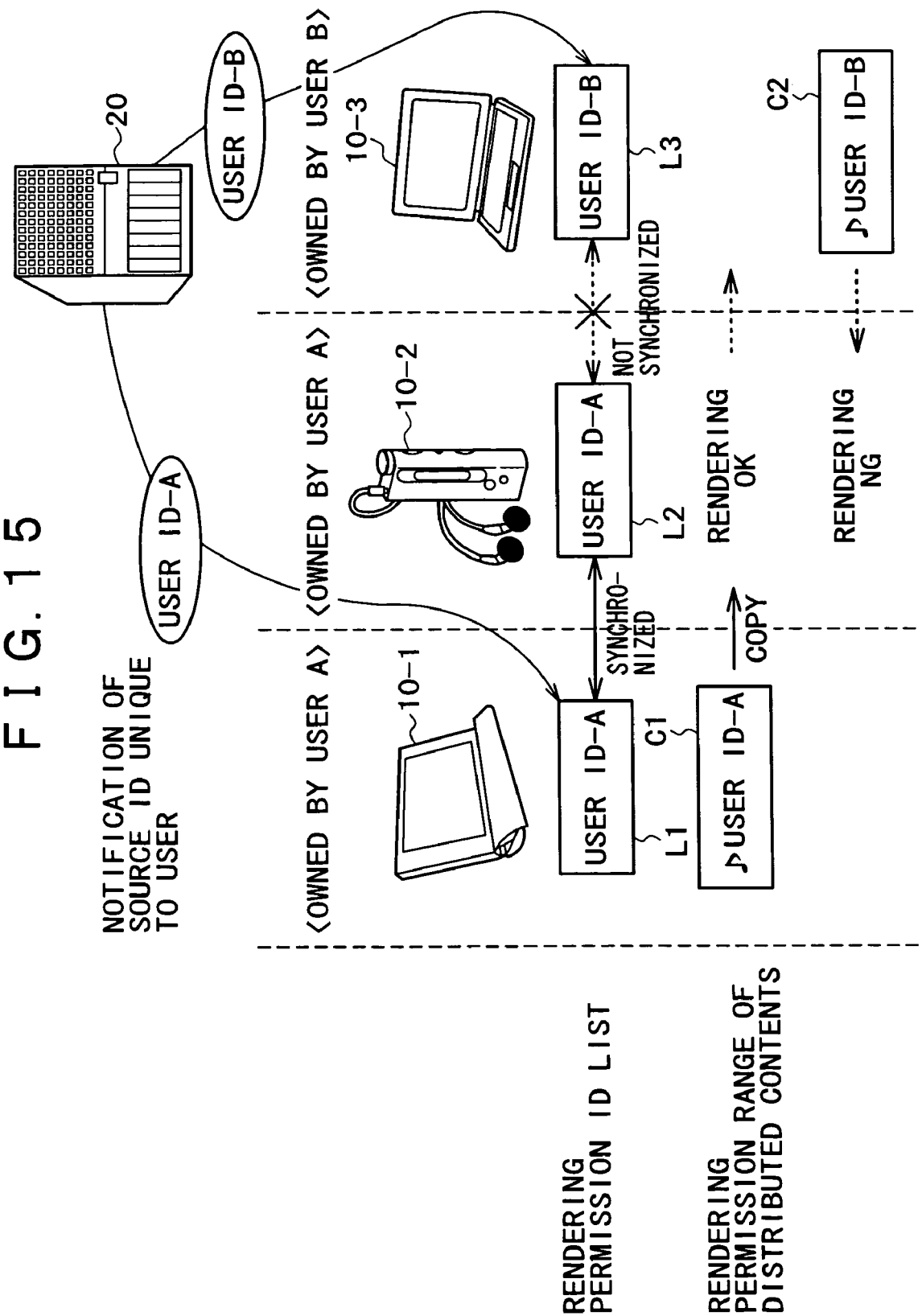

As seen from FIG. 15, in the application example 4, upon sharing of distribution content data, addition of source IDs corresponding to a plurality of users to the rendering permission ID list L2 of the single content processing apparatus 10-2 is inhibited.

In particular, the content processing apparatus 10-1 owned by the user A has, in the rendering permission ID list L1 thereof, the source ID "user ID-A" received from the distribution server 20, connected to the distribution server 20 via the network 5 similarly as in the application example 3 described above. Also the content processing apparatus 10-3 owned by the user B similarly has the source ID "user ID-B" in the rendering permission ID list L3 thereof.

If the rendering permission ID list L1 of the content processing apparatus 10-1 and the rendering permission ID list L2 of the content processing apparatus 10-2 owned by the user A are synchronized with each other, then the source ID "user ID-A" can be added to the rendering permission ID list L2. Once the source ID "user ID-A" is added to the rendering permission ID list L2, however, it is inhibited to add the source ID "user ID-B" corresponding to the different user B. Therefore, the rendering permission ID list L2 of the content processing apparatus 10-2 has only the source ID "user ID-A".

Accordingly, if the content processing apparatus 10-2, owned by the user A, copies the content data C1 distributed to the content processing apparatus 10-1 of the user A, then it can render the content data C1, but even if it copies the content data C2 distributed to the content processing apparatus 10-3 of the user B, it cannot render the content data C2.

It is to be noted that if the owner of the content processing apparatus 10-2 is changed from user A to user B, then it is possible to delete the source ID "user ID-A" in the rendering permission ID list L2 and add the source ID "user ID-B" newly to the rendering permission ID list L2.

In this manner, in the application example 4, the distribution content data that can be rendered by one content processing apparatus 10-2 registered for distribution content data can be limited to distribution content data which has been distributed to a user who is the owner of the content processing apparatus 10-2.

Application Example 5

Now an application example 5 of the content sharing system 100 in accordance with the present embodiment is described with reference to FIG. 16.

Figure 16:
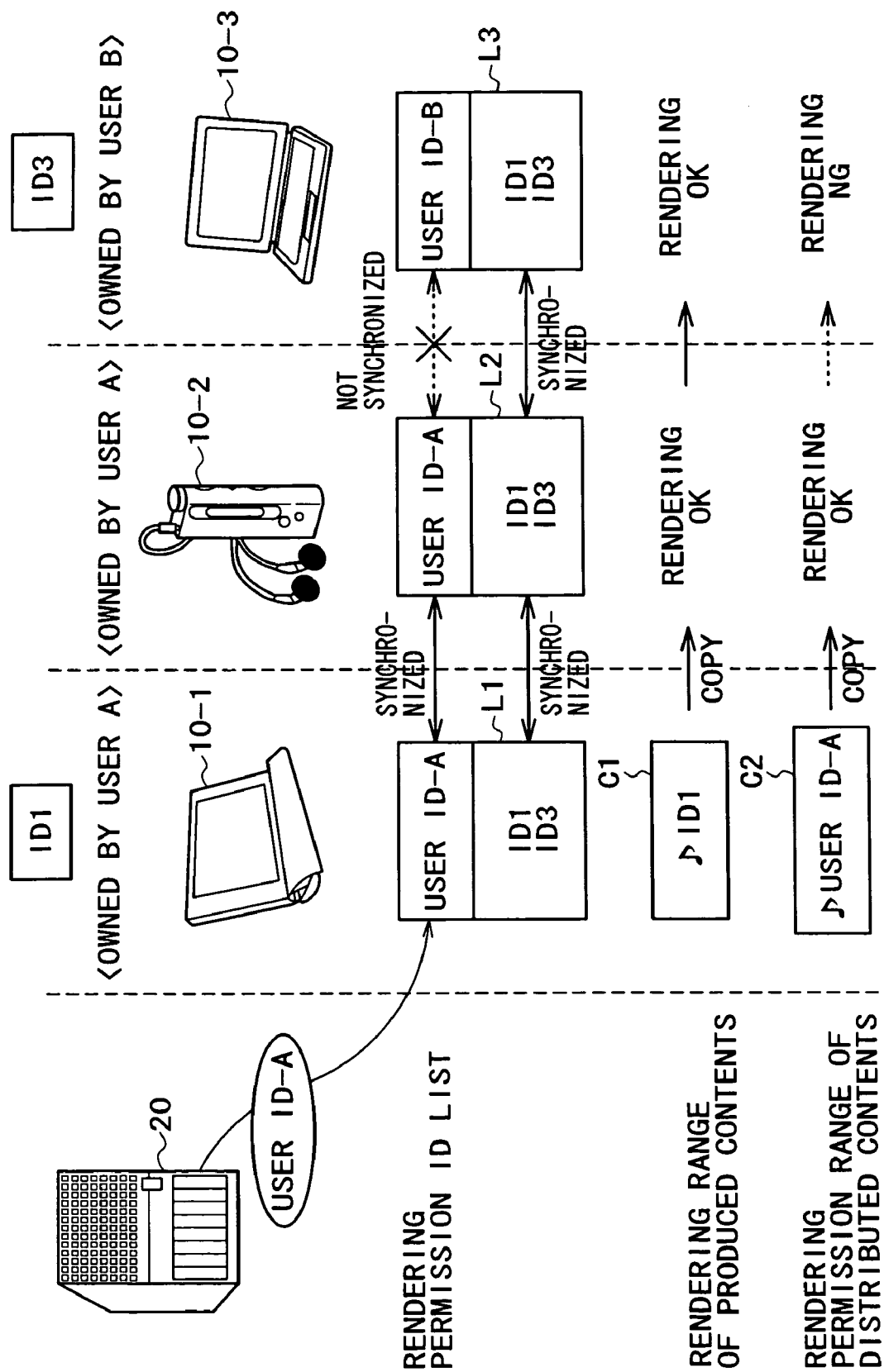

As seen from FIG. 16, in the application example 5, employment of list management is changed in response to the type of a source ID, or in other words, employment of a source ID for distribution content data and employment of a source ID for production content data are combined.

In particular, to production content data produced by the content processing apparatuses 10-1 and 10-3, source IDs "ID1" and "ID3" for a measurement of an apparatus corresponding to the content processing apparatus 10 are added, respectively. On the other hand, to distribution content data distributed from the distribution server 20, source IDs "user ID-A" and "user ID-B" for a measurement of a user corresponding to user accounts of a distribution service are added.

Further, the addition permission criterion of a source ID is made different among the different content processing apparatuses 10-1, 10-2, and 10-3 depending upon the type of the source ID.

In particular, as regards the source ID in a measurement of a user added to distribution content data, only the user ID of the owner of the content processing apparatus 10 is permitted for registration as similarly described in the application example 4 above. In other words, the content processing apparatuses 10-1 and 10-2 owned by the user A (for example, the father) are permitted to possess only the source ID "user ID-A" in the rendering permission ID lists L1 and L2, while the content processing apparatus 10-3 owned by the user B (for example, a son) is permitted to possess only the source ID "user ID-B" in the rendering permission ID list L3.

On the other hand, as regards the source ID in a measurement of an apparatus added to production content data, the source IDs "ID1" and "ID3" in a measurement of an apparatus are permitted to be synchronized with each other without any limitation among the content processing apparatus 10-1 to 10-3 in a home, as similarly described as in the application example 1 above. This makes it possible for the rendering permission ID lists L1 to L3 to share the source IDs "ID1" and "ID3".

Where such list management as described above is performed, for example, the source ID "user ID-A" for a measurement of a user is added to the content data C2 received by the content processing apparatus 10-1 owned by the user A. Therefore, the content data C2 can be rendered by the content processing apparatus 10-2 owned by the user A, but is disabled to render on the content processing apparatus 10-3 owned by the user B. In this manner, even if a content processing apparatus 10 is in the same home, if the owner of the content processing apparatus 10 is different, then sharing of distribution content data by the content processing apparatus 10 is rejected.

Meanwhile, the source ID "ID1" for a measurement of an apparatus is added to the production content data C1 produced by the content processing apparatus 10-1. The production content data C1 can be rendered by both of the content processing apparatus 10-2 and the content processing apparatus 10-3 irrespective of their owners. In this manner, production content data can be shared freely by the different content processing apparatuses 10 in the home.

Second Embodiment

Now a content sharing system 100 in accordance with a second embodiment of the present invention is described. The content sharing system 100 in accordance with the second embodiment is characterized in that management of the rendering permission ID lists L owned by the different content processing apparatuses 10 is performed not by the individual content processing apparatuses 10 but in a concentrated manner by a management server. Except for this characteristic, the content sharing system 100 of the present embodiment has a functional configuration substantially the same as that of the content sharing system 100 of the first embodiment described above, and overlapping description of particulars of the common functional configuration is omitted herein to avoid redundancy.

1. SYSTEM CONFIGURATION

The content sharing system 100 according to the present embodiment is described below with reference to FIG. 17.

Figure 17:
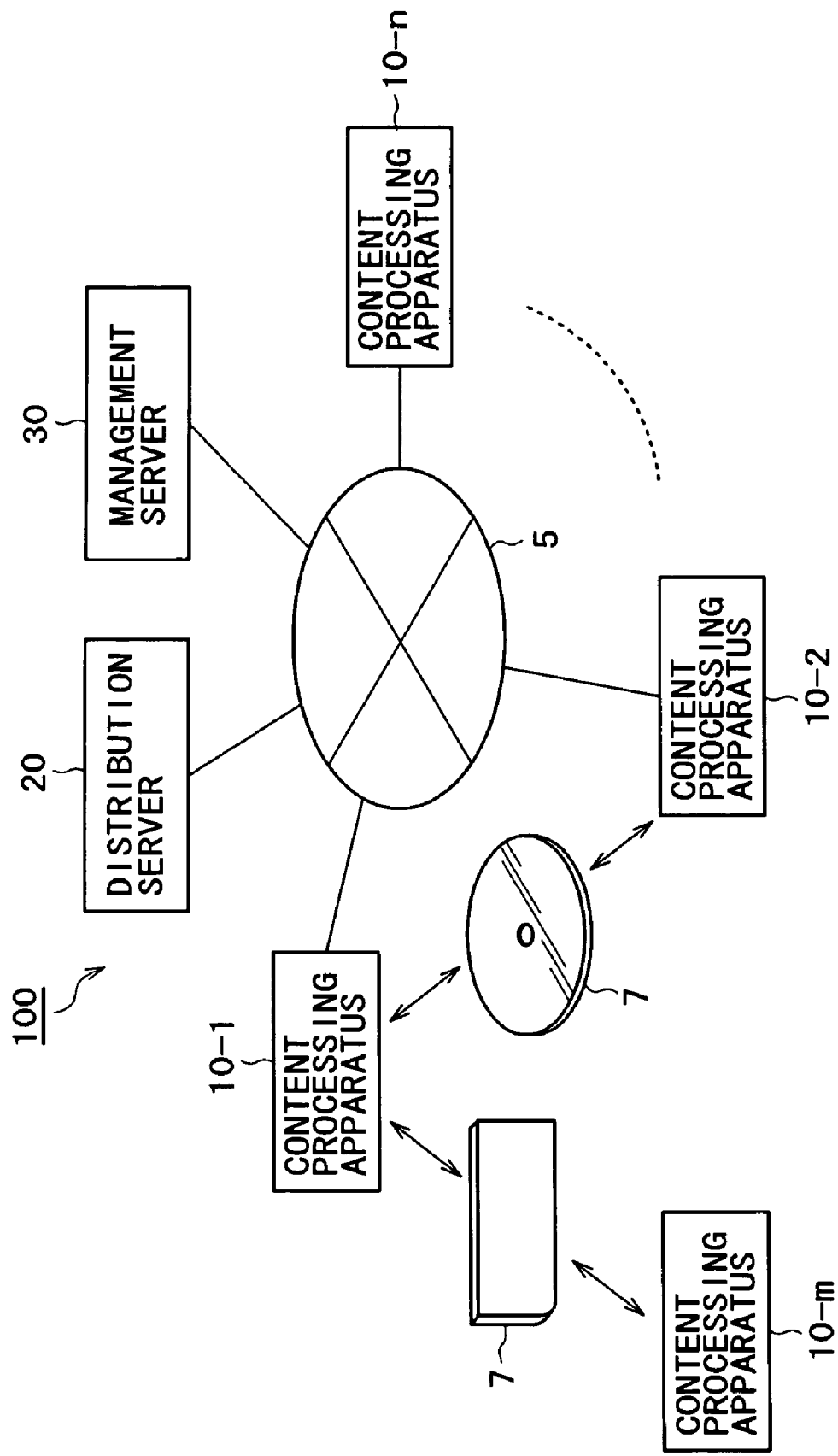
FIG. 17 is a block diagram schematically showing a general configuration of a content sharing system in accordance with a second embodiment of the present invention.

The content sharing system 100 as shown in FIG. 17 includes, for example, a plurality of content processing apparatuses 10, a distribution server 20, a management server 30, a network 5 for interconnecting the apparatuses mentioned, and a recording medium 7. The content processing apparatuses 10, distribution server 20, network 5, and recording medium 7 are similar to those in the first embodiment described above, and therefore overlapping description of them is omitted herein to avoid redundancy.

The management server 30 is a server apparatus connected via the network 5 to the plural content processing apparatuses 10, and it is formed from an information processing apparatus, such as a computer apparatus. The management server 30 has a function of collectively managing the rendering permission ID lists L provided in the plural content processing apparatuses 10. More particularly, the management server 30 can update the rendering permission ID lists L by controlling addition, deletion, and so forth of a new source ID to or from the rendering permission ID lists L of the individual content processing apparatuses 10.

In this manner, in the present embodiment, since the management server 30 has a function and a configuration corresponding to the list management section 3 described above with reference to FIG. 1, for example, each of the content processing apparatuses 10 need not necessarily include the list management section 190, and also the distribution server 20 need not necessarily include the list management section 290. Since each of the content processing apparatuses 10 performs a process of rewriting the rendering permission ID list L recorded in the storage apparatus 114 or the like of the content processing apparatus 10 itself, however, it may additionally include, for example, the list updating execution section 199 described above with reference to FIG. 7.

Further, the management server 30 can transmit and receive, for example, to and from the distribution server 20, various data such as user information, authentication information, and accounting information. It is to be noted that the management server 30 and the distribution server 20 may be formed as the same server apparatus.

2. MANAGEMENT SERVER

Now the management server 30 in the present embodiment is described in detail with reference to FIG. 18.

Figure 18:
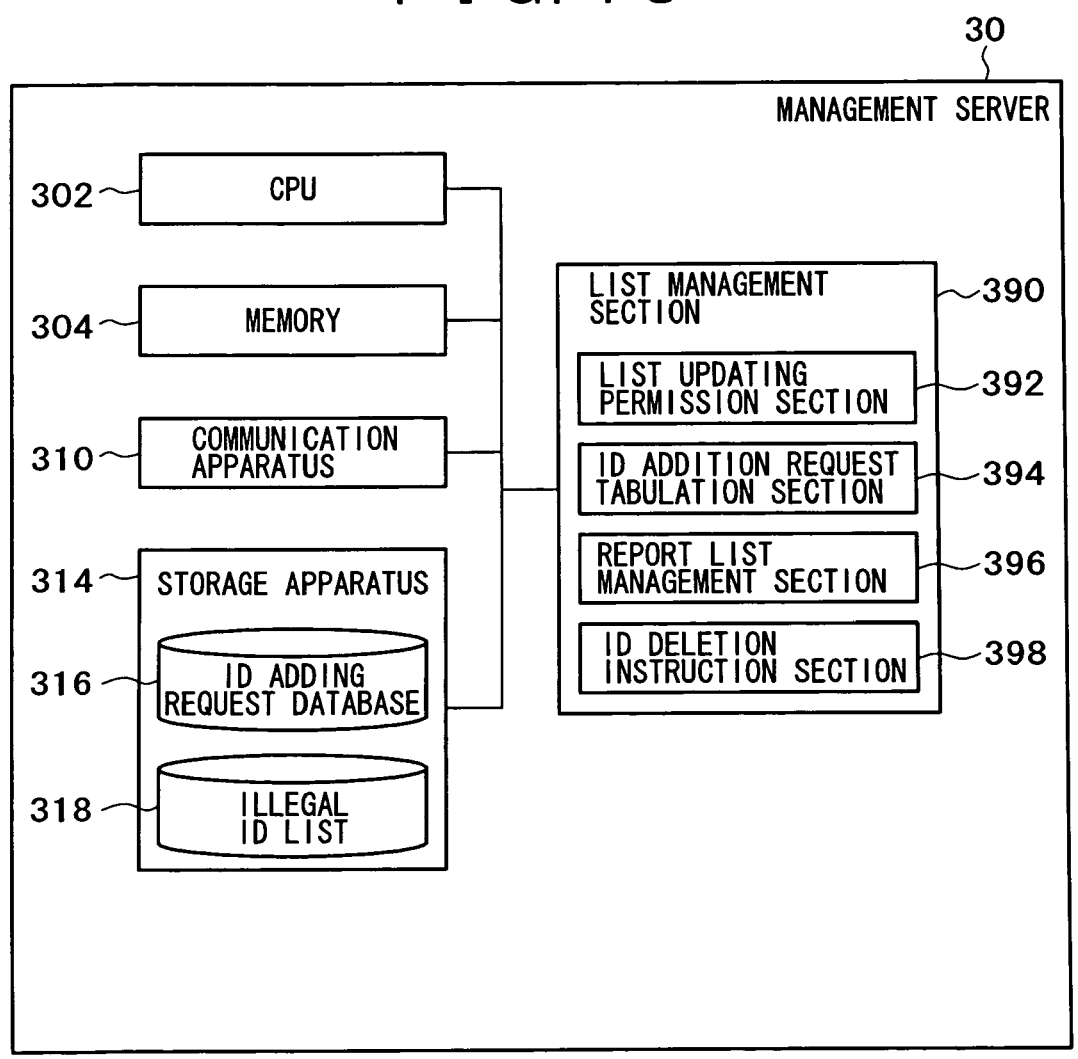
FIG. 18 is a block diagram schematically showing a configuration of a management server shown in FIG. 17.

As seen from FIG. 18, the distribution server 20 includes a CPU 302, a memory 304, a communication apparatus 310, a storage apparatus 314, and a list management section 390. The CPU 302, memory 304, and communication apparatus 310 have substantially the same functional configuration as the CPU 102, memory 104, and communication apparatus 110 of the content processing apparatus 10 described above, respectively, and therefore overlapping description of them is omitted herein to avoid redundancy.

The storage apparatus 314 is an apparatus for storing data, formed from, for example, a hard disk drive, and can store various kinds of data of programs and so forth. Further, the storage apparatus 314 has an ID adding request database 316 and an illegal ID list 318 stored therein.

The ID adding request database 316 is a database that includes information relating to requests for addition of a source ID from the individual content processing apparatuses 10 (for example, a source ID whose request for addition has been received, the number of times for which a request for addition of each source ID has been received, a content processing apparatus 10 of a source of the request, the date and hour of the request, and so forth).

The illegal ID list 318 is a list of those source IDs added to content data whose rendering is inhibited, such as a source ID that corresponds to an illegal user who has conducted illegal utilization of content data such as illegal copy or distribution by a great amount, or a source ID corresponding to a content processing apparatus 10 owned by an illegal user.

The list management section 390 is a component corresponding to the list management section 3 described above with reference to FIG. 1, and it performs an updating process of the rendering permission ID list L included in the content processing apparatus 10. The list management section 290 includes a list updating permission section 392, an ID addition request tabulation section 394, a report list management section 396, and an ID deletion instruction section 398.

The list updating permission section 392 permits/rejects updating of the rendering permission ID list L of any content processing apparatus 10, such as addition of a new source ID to the rendering permission ID list L of the content processing apparatus 10. For example, the list updating permission section 392 can permit/reject, in response to a request for addition of a new source ID from any content processing apparatus 10, the addition of the source ID of the object of the request for addition to the rendering permission ID list L included in the content processing apparatus 10. If the list updating permission section 392 permits the addition of the source ID, it transmits an addition permission signal, for example, to the list updating execution section 199 of the list management section 190 of the content processing apparatus 10 of the source of the request for addition. As a result, the list updating execution section 199 of the content processing apparatus 10 performs a process of adding the source ID to the rendering permission ID list L of the content processing apparatus 10. On the other hand, if the list updating permission section 392 rejects the addition of the source ID, it transmits, for example, an addition rejection signal to the content processing apparatus 10 of the source of the request for addition.

The permission process of the addition of the source ID of the list updating permission section 392 described above is performed based on a predetermined ID addition criterion. The ID addition criterion of the list updating permission section 292 may be, for example, the criteria 1 to 6 described above, and overlapping description of particular explanation of them is omitted herein to avoid redundancy.

It is to be noted that, if the list updating permission section 392 tries to perform a permission process based on the "illegal ID list" of the criterion 4, described above, for example, it refers to the illegal ID list 318 stored in the ID adding request database 316 and permits the addition of the source ID if the source ID of the object of the request for addition is not included in the illegal ID list 318, but it rejects the addition if the source ID of the object of the request for addition is included in the illegal ID list 318.

On the other hand, if the list updating permission section 392 tries to perform a permission process based on the criterion 5 "result of authentication of the content processing apparatus 10 of a source of request for addition or the user of the content processing apparatus 10" or the criterion 6 "presence or absence of an accounting process for a request for updating", it may, for example, communicate user information or accounting information with the distribution server 20, or it may issue a request for a permission process to the list updating permission section 292 of the distribution server 20.

The ID addition request tabulation section 394 is formed as an updating request tabulation section. The ID addition request tabulation section 394 performs a process of tabulating requests for addition from the individual content processing apparatuses 10 and adding a source ID, for example, with regard to which an excessively great number of requests for addition has been received, as an illegal source ID to the illegal ID list 318.

More particularly, every time the ID addition request tabulation section 394 receives a request for addition of a source ID from any of the content processing apparatuses 10, it classifies the source ID of an object of the request for addition and counts the number of requests for addition for each source ID. As a result of the counting, for example, if the number of times for which a request for addition of a certain source ID has been received exceeds a predetermined allowable number of times (for example, 10 times or 100 times), then the list updating permission section 392 determines that the source ID is an illegal source ID.

In particular, if an illegal user conducts such illegal utilization as, for example, to distribute distribution content data by a great amount to many and unspecified users or lay distribution content data open for downloading on the Internet, then it is estimated that a request for addition of the source ID added to the distribution content data is received from a great number of content processing apparatuses 10 that have acquired the distribution content data. On the other hand, if content data is utilized within the range of private use such as, for example, copying of the content data by the content processing apparatuses 10 in the private network, it is estimated that the number of times by which a request for addition of the source ID added to the content data does not become very great.

Therefore, it can be considered that where a request for addition of the same source ID is received for a number of times greater than the acceptable number of times, content data to which the source ID is added is utilized illegally beyond the range of private use. Consequently, the ID addition request tabulation section 394 counts the number of times for which a request for addition of each source ID is received and can discriminate, based on the counted number of times, whether or not the source ID is an illegal source ID. Therefore, illegal utilization of content data can be monitored in a measurement of a source ID.

The report list management section 396 manages the rendering permission ID lists L reported from the content processing apparatuses 10. For example, the content rendering sections 180 of each content processing apparatus 10 includes a list reporting section (not shown) for transmitting the rendering permission ID list L provided therein to the management server 30 periodically or in response to a reporting instruction or the like. Thus, the report list management section 396 receives via the network 5, for example, periodically or as a response to a reporting instruction transmitted thereto, the rendering permission ID lists L from the list reporting sections of the content processing apparatuses 10 or the like, and it takes statistics of source IDs included in the received rendering permission ID lists L for the individual source IDs. If, for example, the number of rendering permission ID lists L including the same source ID is greater than a predetermined upper limit number, then the report list management section 396 determines that the source ID is an illegal source ID and adds the source ID to the illegal ID list 318.

In this manner, the report list management section 396 can monitor illegal utilization of content in a measurement of a source ID similarly to the ID addition request tabulation section 394 described above. The report list management section 396 is particularly useful where a system configuration in which addition of all source IDs to the rendering permission ID list L is acknowledged unconditionally without the provision of the list updating permission section 392. In particular, in this instance, since each content processing apparatus 10 of each user can add a source ID without limitation to the rendering permission ID list L included therein, it can render any content data. In this instance, if content data to which a certain source ID is added is distributed by a great amount or in a like case, the source ID is included in the rendering permission ID lists L of an excessively great number of content processing apparatuses. Therefore, the report list management section 396 can detect an illegal source ID by compulsorily acquiring the rendering permission ID lists L from all of the content processing apparatuses 10 and analyzing the source IDs included in the rendering permission ID lists L.

The ID deletion instruction section 398 refers to the illegal ID list 318 to issue to the list updating execution section 199 of each content processing apparatus 10 an instruction to delete from the rendering permission ID list L any source ID included in the illegal source ID list rendering. Consequently, the illegal source ID can be forced to be deleted so as to inhibit illegal utilization of content data.

The components of the management server 30 in the present embodiment are such as described above. Where the list management section 390 is provided in the management server 30 and manages updating of the rendering permission ID lists L of the content processing apparatus 10 as described above, statistics of the rendering permission ID lists L and overall management of source IDs of an object of a request for addition can be implemented, and falsification of the rendering permission ID lists L can be prevented effectively. Therefore, sharing permission/rejection management of content data in a measurement of a source ID can be executed with a higher degree of diversity and safely.

3. APPLICATION EXAMPLES

Now application examples wherein content data is shared by a plurality of content processing apparatuses 10 in the content sharing system 100 in accordance with the second embodiment having the configuration described above are described.

Application Example 1

First, an application example 1 of the content sharing system 100 in accordance with the present embodiment is described with reference to FIG. 19.

Figure 19:
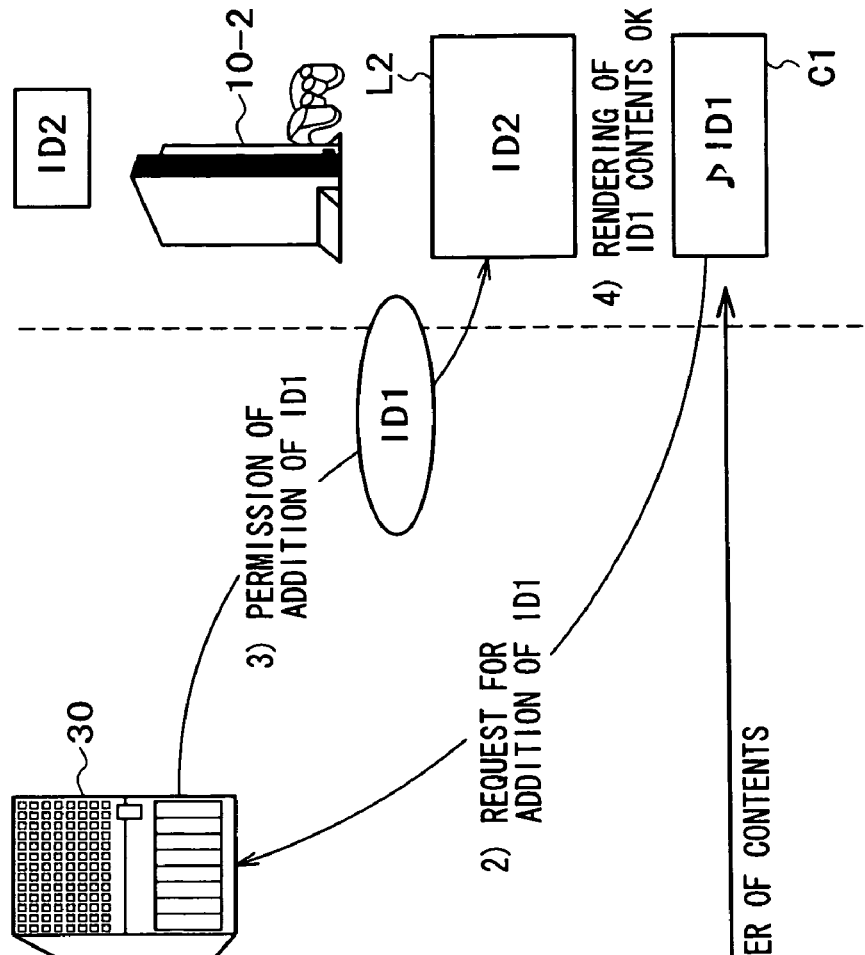

As seen in FIG. 19, in the application example 1, two content processing apparatuses 10-1 and 10-2 connected to the Internet share content data C1 of the content processing apparatus 10-1.

In particular, the content data C1 is produced on the content processing apparatus 10-1, and a source ID "ID1" is added to the content data C1. Then, the content processing apparatus 10-1 transfers via the Internet to the content processing apparatus 10-2 the content data C1 having the source ID "ID1" added thereto.

Then, the content processing apparatus 10-2 records the acquired content data C1 into the storage apparatus 114 or the like. Further, the content processing apparatus 10-2 tries to render the content data C1. Since the source ID "ID1" is not included in the rendering permission ID list L2, however, the content processing apparatus 10-2 cannot render the content data C1 to which the source ID "ID1" is added. Therefore, the list synchronization section 196 of the content processing apparatus 10-2 issues to the list management section 390 of the management server 30 a request for addition of the source ID "ID1" to the rendering permission ID list L2.

Then, the list management section 390 of the management server 30 permits addition of the source ID "ID1" if an ID addition criterion is satisfied (for example, if the owners of the content processing apparatus 10-1 and the content processing apparatus 10-2 are the same person). As a result, the source ID "ID1" is added to the rendering permission ID list L2, and therefore the content processing apparatus 10-2 is enabled to render the content data C1.

In this manner, in the application example 1, the management server 30 can permit sharing of content data between the plural content processing apparatuses 10-1 and 10-2 connected to the Internet or the like. Consequently, for example, even where a plurality of content processing apparatuses 10 owned by a user are located at places remote from each other (for example, at the user's house and place of business), the rendering permission ID lists L can be updated suitably. Therefore, each of the content processing apparatuses 10 can render content data of any other one of the content processing apparatuses 10, and the content data can be shared suitably by them.

Application Example 2

Now an application example 2 of the content sharing system 100 in accordance with the present embodiment is described with reference to FIG. 20.

As seen from FIG. 20, in the application example 2, a user who distributes distribution content data by a great amount among a plurality of content processing apparatuses 10-1, 10-2, . . . , 10-n connected to the Internet is detected based on the number of requests for addition of a source ID from the content processing apparatuses 10.

In particular, the user A would first access the distribution server 20 from the content processing apparatus 10-1 or 10-2, owned by the user A, to perform user registration in a content distribution service. Upon such registration, or upon issuance of a request for notification of a source ID from the content processing apparatus 10-1, the distribution server 20 notifies the content processing apparatus 10-1 of the source ID "user ID-A". In response to the notification, the content processing apparatus 10-1 adds the source ID "user ID-A" to the rendering permission ID list L1 thereof.

Then, if the user A uses the content processing apparatus 10-1 to issue a request for distribution of content, then the content data C1 to which the source ID "user ID-A" is added is distributed from the distribution server 20 to the content processing apparatus 10-1. Since the source ID "user ID-A" is included in the rendering permission ID list L1, the content processing apparatus 10-1 can render the content data C1.

Further, the content processing apparatus 10-1 copies (distributes), for example, via the network 5, the content data C1 by a great amount to the content processing apparatuses 10-2 to 10-n owned by different users. The content processing apparatuses 10-2 to 10-n of the copying destinations cannot render the content data C1 because the source ID "user ID-A" is not included in the rendering permission ID lists L2 to Ln, respectively.

Therefore, the list updating requesting sections 186 of the content processing apparatuses 10-2 to 10-n individually issue to the list management section 390 of the management server 30 a request for addition of the source ID "user ID-A" to the rendering permission ID lists L2 to Ln.

Consequently, the ID addition request tabulation section 394 in the list management section 390 of the management server 30 counts the number of requests from the content processing apparatuses 10-2 to 10-n for addition regarding the source ID "user ID-A". Then, if the counted number of requests for addition exceeds an allowable number, the ID addition request tabulation section 394 determines that the source ID "user ID-A" is an illegal source ID. As a result, it is determined that the "user A" that is the content providing source specified by the source ID "user ID-A" is an illegal user.

Then, the ID deletion instruction section 398 of the management server 30 transmits to the content processing apparatuses 10-2 to 10-n a deletion instruction signal for the source ID "user ID-A". Consequently, the list updating execution sections 398 of the content processing apparatuses 10-2 to 10-n delete from the rendering permission ID lists L2 to Ln, respectively, the source ID "user ID-A" of an object of the deletion instruction rendering. As a result, the content processing apparatuses 10-2 to 10-n are disabled to render content data to which the source ID "user ID-A" is added, such as the content data C1.

In this manner, in the application example 2, a content providing source by which illegal utilization of content data is performed can be detected by the management server 30 counting the number of requests for addition. Therefore, it is possible to erase the registration of the illegal user in the distribution service or to delete a source ID corresponding to the illegal user from the rendering permission ID lists L of all of the content processing apparatus 10. Accordingly, such illegal utilization of content data, such as an action of distribution by a great amount, can be prevented suitably.

Application Example 3

Now, an application example 3 of the content sharing system 100 according to the present embodiment is described with reference to FIG. 21.

As seen from FIG. 21, in the application example 3 as shown, a user who distributes distribution content data by a great amount among a plurality of content processing apparatuses 10-1, 10-2, . . . , 10-n connected to the network 5 is detected based on list reports from the different content processing apparatuses 10. It is to be noted that each of the content processing apparatuses 10 in the application example 3 can unconditionally add a source ID to the rendering permission ID list L provided therein.

More particularly, the content processing apparatus 10-1 owned by the user A is first registered in a content distribution service. The source ID "user ID-A" is added to the rendering permission ID list L1 in response to notification from the distribution server 20, and then the content data C1 is downloaded. The processing just mentioned is substantially same as that in the application example 2 described above, and therefore overlapping detailed description thereof is omitted to avoid redundancy.

Then, for example, the content processing apparatus 10-1 copies (distributes) via network 5 the content data C1 by a great amount to the content processing apparatuses 10-2 to 10-n owned by different users. At this point of time, the source ID "user ID-A" is not included in the rendering permission ID lists L2 to Ln of the content processing apparatus 10-2 to 10-n of the destinations of the copying.

Then, when each of the content processing apparatuses 10-2 to 10-n tries to render the content data C1, it extracts the source ID "user ID-A" from the content data C1 and adds it unconditionally to the respective rendering permission ID list L2 to Ln. Consequently, the content processing apparatus 10-2 to 10-n are enabled to render the content data C1.

Thereafter, the content processing apparatus 10-1 to 10-n transmit the respective rendering permission ID lists L1 to Ln thereof to the management server 30 so as to report the contents of the lists. The report list management section 396 of the management server 30 tabulates the content processing apparatuses 10-1 to 10-n for each source ID. As a result, if the source ID "user ID-A" is included in a number of rendering permission ID lists L greater than a predetermined upper limit number, then the report list management section 396 of the management server 30 determines that the source ID "user ID-A" is an illegal source ID. As a result, the report list management section 396 of the management server 30 determines that the "user A", which is a content providing source specified with the source ID "user ID-A", is an illegal user. Further, the ID deletion instruction section 398 of the management server 30 may forcibly delete the source ID "user ID-A" from the rendering permission ID list rendering permission ID lists L1 to Ln.

In this manner, in the application example 3, the management server 30 causes each of the content processing apparatuses 10 to periodically report its rendering permission ID list L thereby to manage the utilization conditions of content data in the content processing apparatuses 10, and it can thereby detect a content providing source that conducts illegal utilization of content data. Therefore, it is possible to delete the registration of the illegal user in the distribution service or delete the source ID corresponding to the illegal user from the rendering permission ID lists L of all of the content processing apparatuses 10. Accordingly, such illegal utilization of content data as an action of distributing content data by a great amount can be prevented suitably.

The content sharing systems 100 in accordance with the first and second embodiments of the present invention are such as described above. The content sharing systems 100 perform copyright management of content by managing content data shared by a plurality of content processing apparatuses 10 in a measurement of a content providing source (in a measurement of a user of a providing source or in a measurement of an apparatus) and limiting rendering of content data by the content processing apparatuses 10 in response to the content providing source. In other words, the content sharing systems 100 can permit/reject sharing of content data in a measurement of a content providing source.

Therefore, where a content providing source is an illegal content providing source, the content processing apparatus 10 on the content acquiring side can collectively inhibit rendering of all content data acquired from the illegal content providing source. Accordingly, such illegal actions as, for example, an action of distributing content data by a great amount to many and unspecified users and an action of laying distribution content data open for downloading on the Internet can be prevented effectively.

On the other hand, if a providing source of content is a legal content providing source, then once sharing of content data from the content providing source is permitted, any content data provided from the permitted content providing source can be rendered freely, even if a plurality of content data are involved. Therefore, within the range of private use, content data can be copied freely between a plurality of content processing apparatuses 10. Consequently, copyright management near to that by a conventional analog content distribution system, which acknowledges limitless copying for only private utilization, can be implemented.

From the foregoing, the content sharing systems 100 in accordance with the embodiments described above can achieve both (1) implementation of a copyright management function of limiting an action of illegally utilizing content data without payment of a proper consideration to a content distribution service or the like, and (2) avoidance of obstruction of utilization of content within the range of private use for a proper consideration paid.

Further, it is necessary in principle for a copyright management process of permitting sharing of content data in a measurement of a content providing source to be performed only once upon registration, or upon first distribution of a content distribution service, or upon utilization of content data from a new content providing source. Accordingly, the content sharing systems 100 in accordance with the embodiments described above can achieve improvement in efficiency of the copyright management function when compared with a conventional system wherein a copyright management process is executed every time copying of content is performed.

Further, where list management is performed in each content processing apparatus 10, as in the first embodiment described above, since there is no necessity for a system for managing the numbers of copies of content data in a concentrated manner, the degree of freedom in designing of the user interface or the content processing apparatus 10 can be raised. More particularly: (1) there is no necessity to use special means for copying and backup of content data; (2) since there is no necessity to use a user interface for exclusive use, such an interface as a content copying application or a content backup application for copyright management is not required; (3) there is no necessity for consideration of interruption of a service or crush of a system such as a management server or a personal computer that manages the numbers of copies in a concentrated manner; (4) there is no necessity for consideration of connections between the content processing apparatuses 10 that utilize content and a server for managing the copyright in a concentrated manner; and (5) since the necessary process can be executed only in the content processing apparatus 10 without using a management server, a high speed process can be anticipated.

Accordingly, where content data is shared using a plurality of content processing apparatuses within the range of private utilization, no restriction is required to the connection configuration between the apparatus or the performances of the apparatus, and therefore, the degree of freedom in designing can be raised.

Further, with the content sharing systems 100 in accordance with the embodiments described above, only by additionally recording a rendering permission ID list L on an ordinary recording medium (removable medium) together with content data, a copyright management dealing function (that is, a function of licensing content only by sole circulation of a removable medium) can be added to the recording medium. Therefore, a recording medium with a copyright management leading function can be designed readily. Further, by recording content having a source ID added thereto on a recording medium, copyright management can be performed in a measurement of a content provider even on the recording medium.

The present invention can be applied to a content sharing system wherein content data is shared by a plurality of apparatuses and particularly to a content sharing system that involves copyright management of content.

Having described preferred embodiments of the present invention with reference to the accompanying drawings, it is intended that the invention not be limited to the examples described above. It is apparent that various changes and modifications may be made, within the meets and bounds of the claims, by those skilled in the art, and it is understood that all such changes and modifications are embraced within the technical scope of the present invention.

What is claimed is:

1. A content sharing system, including a plurality of content processing apparatuses by which content data are shared, comprising:

a content providing side content processing apparatus comprising:
  a source ID addition section configured to add to content data a source ID for specifying said content providing side content processing apparatus as a providing source of the content data for when the content data provided from said content providing side apparatus is later circulated in the content sharing system, and
  a content providing section configured to provide therefrom the content data having the source ID specifying said content providing side content processing apparatus added thereto;

a content acquiring side content processing apparatus comprising:
  a content production section configured to produce content data;
  a source ID addition section configured to add, to the content data produced by said content production section, a source ID specifying said content acquiring side processing apparatus as a providing source of the content data produced by said content production section for when the content data produced by said content production section is later circulated in the content sharing system;
  a content acquiring section configured to acquire from the content providing side content processing apparatus the content data having the source ID specifying said content providing side content processing apparatus added thereto, and
  a content rendering section having a rendering permission ID list including at least one source ID for which rendering is permitted, and is configured to permit rendering of the content data on the content acquiring side content processing apparatus when the source ID added to the content data acquired from the content providing side content processing apparatus is included in said rendering permission ID list and to prevent rendering of the content data on the content acquiring side content processing apparatus when the source ID added to the content data acquired from the content providing side content processing apparatus is not included in said rendering permission ID list; and a list management section configured to permit updating of said rendering permission ID list, wherein said content acquiring side content processing apparatus functions as a client connected to a distribution server that distributes content data via a network, and said source ID addition section is further configured to add, to content data received from said distribution server, a source ID specifying a user account of said content acquiring side content processing apparatus as a providing source of the content data received from said distribution server for when the content data received from said distribution server is later circulated in the content sharing system.

2. A content processing apparatus that shares content data with an external apparatus in a content sharing system, comprising:

a content production section configured to produce content data;

a source ID addition section configured to add, to the content data produced by said content production section, a source ID specifying said content processing apparatus as a providing source of the content data produced by said content production section for when the content data produced by said content production section is later circulated in the content sharing system; and a content providing section configured to provide to the external apparatus the content data having the source ID added thereto by said source ID addition section, wherein the source ID is used by the external apparatus to determine when the content data is permissible to be rendered on the external apparatus when the source ID is registered in a source ID list at the external apparatus, the source ID list including at least one source ID for which rendering is permissible to be rendered at the external apparatus, and the external apparatus prevents rendering of the content data when the source ID added to the content data is not included in said source ID list, said content processing apparatus functions as a client connected to a distribution server which distributes content data via a network, and said source ID addition section is further configured to add, to content data received from said distribution server, a source ID specifying a user account of said content processing apparatus as a providing source of the content data received from said distribution server for when the content data received from said distribution server is later circulated in the content sharing system.

3. The content processing apparatus according to claim 2, wherein a respective source ID added to content data by the source ID addition section is added to uniquely identify a content providing apparatus that provides content data.

4. The content processing apparatus according to claim 2, wherein a respective source ID added to content data by the source ID addition section is added to uniquely identify a user of a content providing apparatus.

5. The content processing apparatus according to claim 2, wherein a respective source ID added to content data by the source ID addition section includes type information of the content data and/or identification information of a providing source of the content data.

6. The content processing apparatus according to claim 2, wherein said processing apparatus functions as a distribution server for distributing, via a network, content data to one or more clients, and said source ID addition section is configured to add, to the content data to be distributed to the clients, a source ID corresponding to the client of the destination of the distribution or to a user of the client.

7. The content processing apparatus according to claim 2, wherein said content providing section is configured to transmit, via a network, the content data to provide the content data produced by the content production section and having the source ID added thereto to said external apparatus.

8. The content processing apparatus according to claim 2, wherein said content providing section is configured to provide the content data produced by the content production section and having the source ID added hereto to said external apparatus via a recording medium on which the content data produced by the content production section and having the source ID added thereto is recorded.

9. The content processing apparatus according to claim 2, further comprising:

a content acquiring section configured to acquire, from the external apparatus, content data having a source ID added thereto; and a content rendering section, having a rendering permission ID list including at least one source ID for which rendering is permitted, configured to limit or permit, based on the source ID added to the acquired content data and said rendering permission ID list, rendering of the content data acquired by said content acquisition section.

10. The content processing apparatus according to claim 9, further comprising:

a list management section configured to permit updating of said rendering permission ID list.

11. A content processing apparatus, which shares content data with an external apparatus in a content sharing system, comprising:

a content production section configured to produce content data;

a source ID addition section configured to add, to the content data produced by said content production section, a source ID specifying said content processing apparatus as a providing source of the content data produced by said content production section for when the content data produced by said content production section is later circulated in the content sharing system;

a content acquiring section configured to acquire, from the external apparatus, content data having a source ID added thereto for specifying the external apparatus as a providing source of the content data; and a content rendering section, having a rendering permission ID list including at least one source ID for which rendering is permitted at the content processing apparatus, and is configured to permit rendering of the acquired content data on the content processing apparatus when the source ID added to the acquired content data is included in said rendering permission ID list, and to prevent rendering of the content data on the content processing apparatus when the source ID added to the acquired content data is not included in said rendering permission ID list, wherein said content processing apparatus functions as a client connected to a distribution server that distributes content data via a network, and said source ID addition section is further configured to add, to content data received from said distribution server, a source ID specifying a user account of said content processing apparatus as a providing source of the content data received from said distribution server for when the content data received from said distribution server is later circulated in the content sharing system.

12. The content processing apparatus according to claim 11, wherein said content acquiring section is configured to receive the acquired content data having a source ID added thereto through a network.

13. The content processing apparatus according to claim 11, wherein said content providing section is configured to acquire the acquired content data having a source ID added thereto from said external apparatus via a recording medium on which is recorded the acquired content data having the source ID added thereto.

14. The content processing apparatus according to claim 11, further comprising:
a list updating requesting section configured to issue, to a list management section that permits updating said rendering permission ID list, a request to update said rendering permission ID list.

15. The content processing apparatus according to claim 14, wherein the content rendering section is configured to determine whether the source ID added to the acquired content data is included in said rendering permission ID list, and when the source ID added to the acquired content data is not included in said rendering permission ID list, said list updating requesting section is configured to issue, to the list management section, a request to add, to said rendering permission ID list, the source ID added to the content data rendering.

16. The content processing apparatus according to claim 11, further comprising:
a list management section configured to permit updating of said rendering permission ID list.

17. An information processing apparatus, comprising:
a content production section configured to produce content data;
a source ID addition section configured to add, to the content data produced by said content production section, a source ID specifying said information processing apparatus as a providing source of the content data produced by said content production section for when the content data produced by said content production section is later circulated in a content sharing system;
a storage section configured to store a rendering permission ID list of at least one source ID, corresponding to acquired content data, said at least one source ID specifying another information processing apparatus as a providing source of the acquired content data;
a content rendering section configured to permit rendering of the acquired content data on the information processing apparatus when the source ID added to the acquired content data is included in said rendering permission ID list and to prevent rendering of the acquired content data on the information processing apparatus when the source ID added to the acquired content data is not included in said rendering permission ID list; and
a list management section configured to permit updating of a rendering permission ID list,
wherein said information processing apparatus functions as a client connected to a distribution server that distributes content data via a network, and
said source ID addition section is further configured to add, to content data received from said distribution server, a source ID specifying a user account of said information processing apparatus as a providing source of the content data received from said distribution server for when the content data received from said distribution server is later circulated in the content sharing system.

18. The information processing apparatus according to claim 17, wherein said list management section is configured to permit addition of the source ID corresponding to the acquired content data to said rendering permission ID list, thereby to permit rendering, by said content rendering section, of the acquired content data.

19. The information processing apparatus according to claim 17, wherein said list management section includes a list synchronization section configured to synchronize said rendering permission ID list with another rendering permission ID list that relates to a different content rendering section.

20. The information processing apparatus according to claim 17, wherein said list management section is configured to permit updating of said rendering permission ID list in response to a request, from said content rendering section, for updating of said rendering permission ID list.

21. The information processing apparatus according to claim 20, wherein said list management section is configured to permit, based on a connection formed between said content rendering section and said list management section, updating of said rendering permission ID list.

22. The information processing apparatus according to claim 20, wherein said list management section is configured to permit, based on a result of authentication of the another information processing apparatus, updating of said rendering permission ID list.

23. The information processing apparatus according to claim 20, wherein said list management section is configured to permit, based on whether or not an accounting process for the request for updating is involved, updating of said rendering permission ID list.

24. The information processing apparatus according to claim 17, wherein said list management section is configured to permit, based on a number of source IDs included in said rendering permission ID list, updating of said rendering permission ID list.

25. The information processing apparatus according to claim 17, wherein said list management section is configured to permit, based on type information of a providing source of the acquired content data included in the source ID, updating of said rendering permission ID list.

26. The information processing apparatus according to claim 17, wherein said list management section is configured to permit, based on an illegal ID list that includes source IDs added to content data whose rendering is inhibited, updating of said rendering permission ID list.

27. The information processing apparatus according to claim 17, wherein said information processing apparatus functions as a management server connected, via a network, to a plurality of content processing apparatuses, each including a content rendering section, and said list management section is configured to permit, in response to a request for updating of said rendering permission ID list from any of the content rendering sections of the plurality of content processing apparatuses, updating of said rendering permission ID list.

28. The information processing apparatus according to claim 27, further comprising:
an updating request tabulation section configured to tabulate requests, from each content rendering section of the plurality of content processing apparatuses, for updating of said rendering permission ID list.

29. The information processing apparatus according to claim 28, wherein said updating request tabulation section is configured to tabulate requests for addition of a source ID to said rendering permission ID list from each content rendering section of the plurality of content processing apparatuses and, based on a result of the tabulation of the requests for addition, produce an illegal ID list that includes source IDs added to content data whose rendering is inhibited.

30. A content sharing method for sharing content data between a plurality of content processing apparatuses in a content sharing system, comprising:
- adding a source ID, from a content providing side content processing apparatus, to the content data, said source ID specifying said content providing side content processing apparatus as a providing source of content data for when the content data provided from said content providing side apparatus is later circulated in the content sharing system;
- providing the content data, from the content providing side content processing apparatus, to a content acquiring side content processing apparatus, the content data having the source ID added thereto;
- producing content data at a content production section of the content acquiring side content processing apparatus;
- adding a source ID, at a source ID section of the content acquiring side content processing apparatus, to the content data produced by said content production section, which specifies said content acquiring side processing apparatus as a providing source of the content data produced by said content production section for when the content data produced by said content production section is later circulated in the content sharing system; and
- rendering the content data provided from the content providing side content processing apparatus on the content acquiring side content processing apparatus when a rendering permission ID list stored on the content acquiring side content processing apparatus, which includes at least one source ID for which rendering is permitted, includes the source ID added to the content data provided from the content providing side content processing apparatus, and preventing rendering of the content data provided from the content providing side content processing apparatus on the content acquiring side content processing apparatus when the source ID added to the content data provided from the content providing side content processing apparatus is not included in said rendering permission ID list,
- wherein said content acquiring side content processing apparatus functions as a client connected to a distribution server that distributes content data via a network, and
- said adding further includes adding, to content data received from said distribution server, a source ID specifying a user account of said content acquiring side content processing apparatus as a providing source of the content data recived from said distribution server for when the content data received from said distribution server is later circulated in the content sharing system.

31. The content sharing method according to claim 30, further comprising:
- permitting updating of said rendering permission ID list.

32. The content sharing method according to claim 31, further comprising:
- determining whether or not the source ID added to the content data is included in said rendering permission ID list; and
- issuing, when the source ID added to the content data provided from the content providing side content processing apparatus is not included in said rendering permission ID list, a request to add the source ID added to the content data provided from the content providing side content processing apparatus to said rendering permission ID list;
- said list updating permitting updating of the source ID added to the content data provided from the content providing side content processing apparatus, in response to the request for addition, to said rendering permission ID list.

33. A content processing apparatus, comprising:
- a content production unit configured to produce content data;
- a source ID addition unit configured to add, to the content data produced by said content production unit, a source ID specifying said content processing apparatus as a providing source of the content data produced by said content production unit for when the content data produced by said content production unit is later circulated in a content sharing system;
- a content file creation unit configured to create a content file by adding a source ID specifying the content file creation unit to a content data; and
- a rendering unit configured to determine whether another source ID included in another content data is registered in a permission source ID list and configured to permit rendering of the another content data on the content processing apparatus when the another source ID added to the another content data is included in said permission source ID list and to prevent rendering of the another content data on the content processing apparatus when the another source ID added to the another content data is not included in said permission source ID list,
- wherein the permission source ID list includes at least one source ID for which rendering is permissible at the content processing apparatus,
- said content processing apparatus functions as a client connected to a distribution server that distributes content data via a network, and
- said source ID addition section is further configured to add, to content data received from said distribution server, a source ID specifying a user account of said content processing apparatus as a providing source of the content data received from said distribution server for when the content data received from said distribution server is later circulated in the content sharing system.

34. A method of processing content at a content processing apparatus, comprising:
- producing content data at a content production unit;
- adding, to the content data produced by said content production unit, a source ID specifying said content processing apparatus as a providing source of the content data produced by said content production unit for when the content data produced by said content production unit is later circulated in a content sharing system;
- creating a content file on a content file creation unit on a content processing apparatus by adding a source ID specifying the content file creation unit to a content data;
- determining from the content processing apparatus whether another source ID included in another content data is registered in a permission source ID list; and
- rendering the another content data on the content processing apparatus when the another source ID added to the another content data is included in said permission source ID list and to prevent rendering of the another content data on the content processing apparatus when the another source ID added to the another content data is not included in said permission source ID list,
- wherein the permission source ID list includes at least one source ID for which rendering is permissible at the content processing apparatus,
- said content processing apparatus functions as a client connected to a distribution server that distributes content data via a network, and said adding further includes adding, to content data received from said distribution server, a source ID specifying a user account of said content processing apparatus as a providing source of the content data received from said distribution server for when the content data received from said distribution server is later circulated in the content sharing system.

* * * * *